(12) United States Patent
Smith

(10) Patent No.: US 12,083,839 B2
(45) Date of Patent: Sep. 10, 2024

(54) POWERED TRAILER HITCH

(71) Applicant: POWERHITCH, LLC, Dundee, IL (US)

(72) Inventor: Jerome D. Smith, Dundee, IL (US)

(73) Assignee: POWERHITCH, LLC, Dundee (IL)

( * ) Notice: Subject to any disclaimer, the term of this patent is extended or adjusted under 35 U.S.C. 154(b) by 846 days.

(21) Appl. No.: 17/059,128

(22) PCT Filed: Jul. 26, 2019

(86) PCT No.: PCT/US2019/043706
§ 371 (c)(1),
(2) Date: Nov. 25, 2020

(87) PCT Pub. No.: WO2020/023894
PCT Pub. Date: Jan. 30, 2020

(65) Prior Publication Data
US 2021/0170817 A1    Jun. 10, 2021

Related U.S. Application Data

(60) Provisional application No. 62/852,687, filed on May 24, 2019, provisional application No. 62/764,262, filed on Jul. 26, 2018.

(51) Int. Cl.
  *B60D 1/06* (2006.01)
  *B60D 1/36* (2006.01)
  *B60D 1/24* (2006.01)
  *B60D 1/52* (2006.01)

(52) U.S. Cl.
  CPC .............. *B60D 1/065* (2013.01); *B60D 1/36* (2013.01); *B60D 1/246* (2013.01); *B60D 1/52* (2013.01)

(58) Field of Classification Search
  CPC .......... B60D 1/065; B60D 1/36; B60D 1/246; B60D 1/52; B60D 1/46; B60D 1/06; B60D 1/465; B60D 1/62
  See application file for complete search history.

(56) References Cited

U.S. PATENT DOCUMENTS

| 5,277,447 A | 1/1994 | Blaser |
| 5,465,991 A | 11/1995 | Kass |
| 6,155,588 A | 12/2000 | Maxey |

(Continued)

OTHER PUBLICATIONS

International Search Report from and Written Opinion for International Application No. PCT/US2019/043706 dated Dec. 5, 2019.

*Primary Examiner* — Kevin Hurley
*Assistant Examiner* — Marlon A Arce
(74) *Attorney, Agent, or Firm* — Pranger Law PC

(57) ABSTRACT

A trailer hitch system for coupling a vehicle to a trailer including a housing, a shaft coupled to the housing and being configured to be received within a receiver coupled to the vehicle, a mounting structure including a swing arm extending therefrom, the swing arm being coupled to the housing such that the swing arm can pivot relative to the housing, and an actuator coupled to (i) the housing such that the actuator can pivot relative to the housing and (ii) the swing arm such that movement of the actuator causes corresponding movement of the swing arm between a first position and a second position, thereby aiding in coupling the trailer to the vehicle.

22 Claims, 17 Drawing Sheets

(56) References Cited

U.S. PATENT DOCUMENTS

| | | | |
|---|---|---|---|
| 7,093,845 B1 * | 8/2006 | Fast | B60D 1/50 |
| | | | 280/511 |
| 7,909,350 B1 | 3/2011 | Landry | |
| D862,825 S * | 10/2019 | Angel | D34/28 |
| 2010/0013189 A1 | 1/2010 | Pollock | |
| 2014/0097595 A1 | 4/2014 | Williams, Jr. | |
| 2015/0102581 A1 | 4/2015 | Schwennsen | |
| 2015/0137483 A1 | 5/2015 | Morga | |
| 2017/0174023 A1 * | 6/2017 | Hu | B60D 1/145 |

* cited by examiner

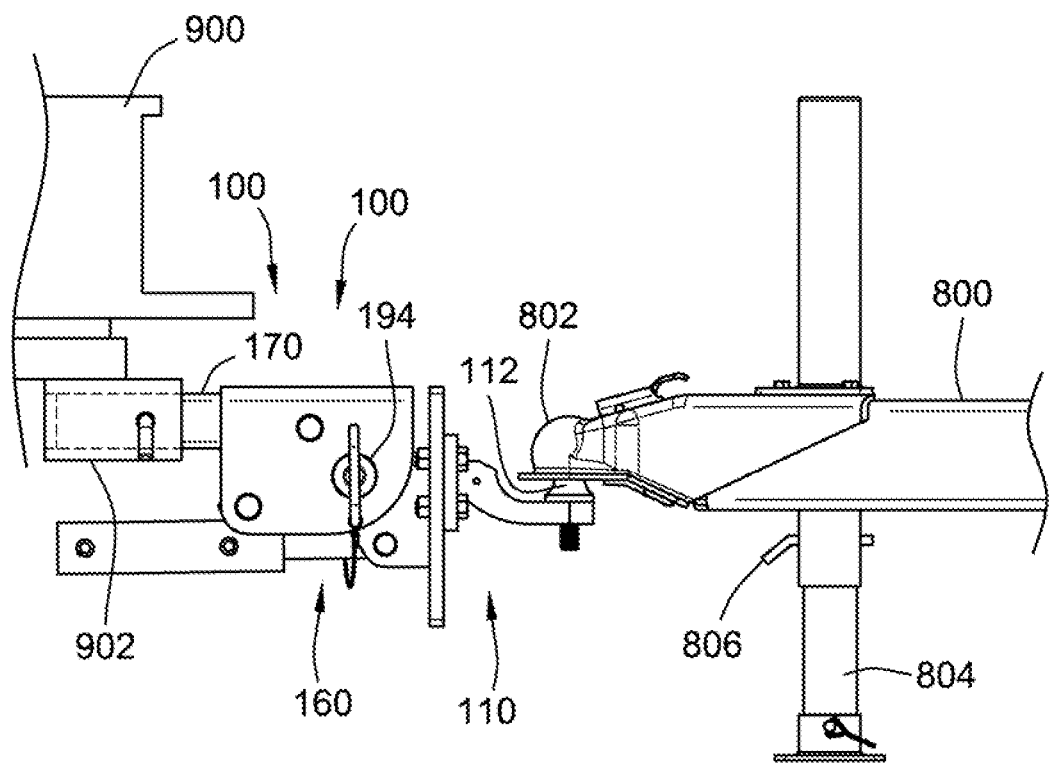
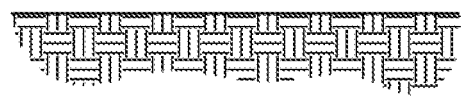
FIG. 8C

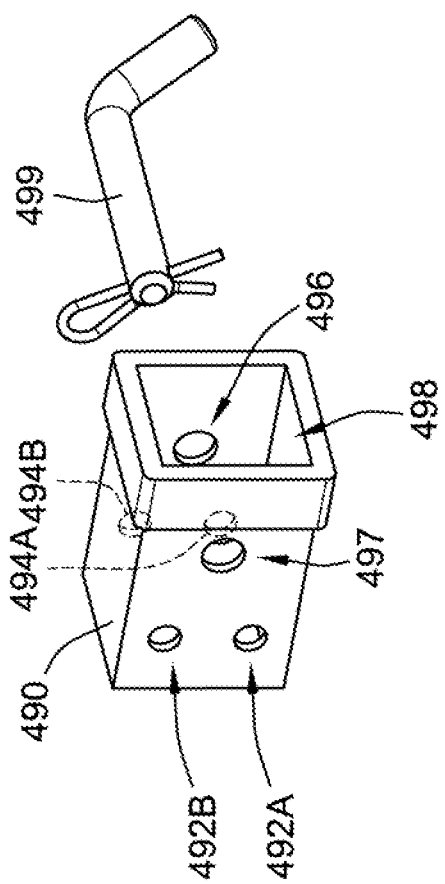

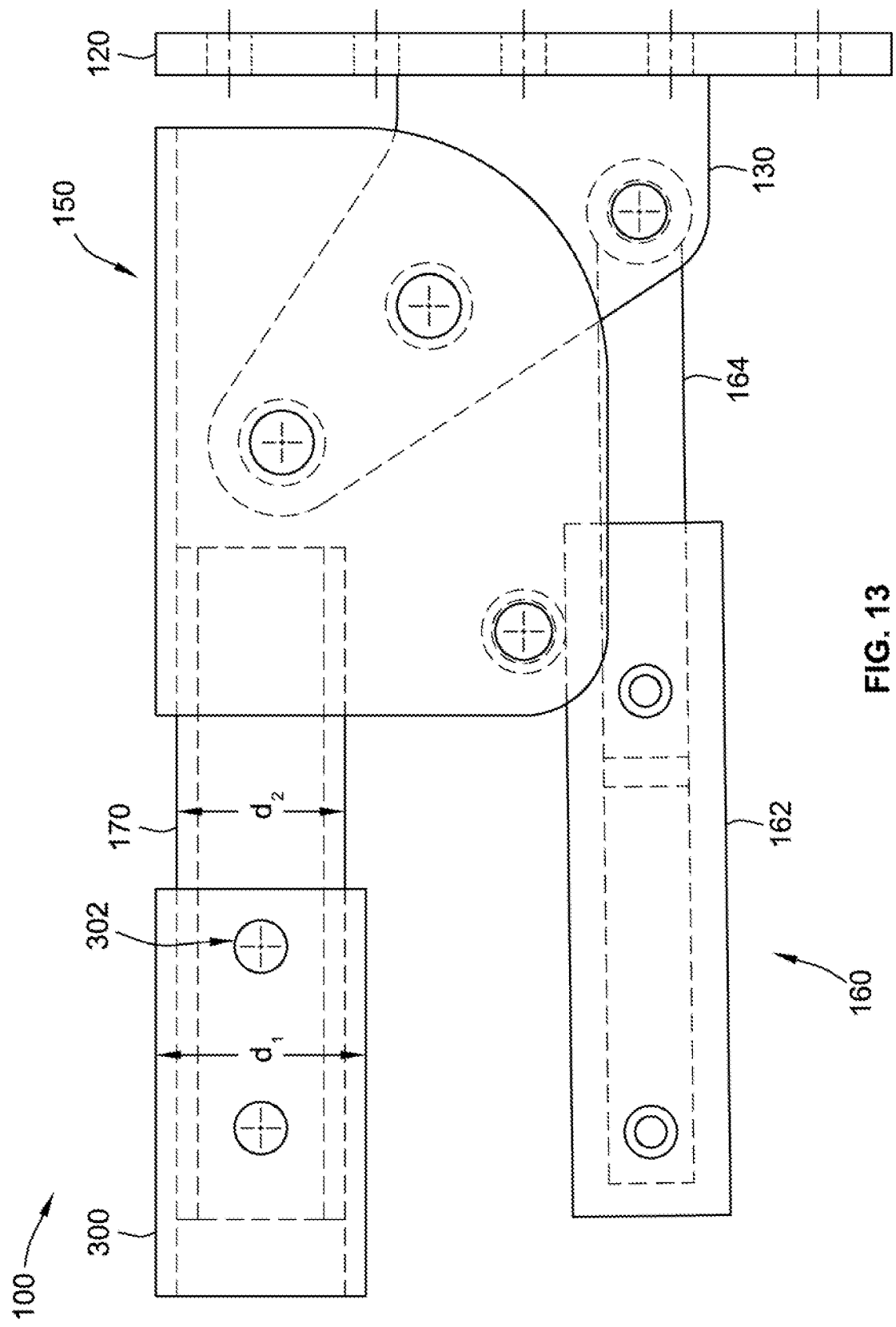

POWERED TRAILER HITCH

CROSS-REFERENCE TO RELATED APPLICATIONS

This application is a U.S. National Stage of International Application No. PCT/US2019/043706, filed Jul. 26. 2019, which claims the benefit of and priority to U.S. Provisional Application No. 62/852,687, filed May 24, 2019, and U.S. Provisional Application No. 62/764,262, filed Jul. 26, 2018, the disclosures of which are each hereby incorporated by reference herein in their entireties.

TECHNICAL FIELD

The present disclosure relates generally to trailer hitches, and more particularly, to powered trailer hitch systems and methods of using the same.

BACKGROUND

Trailer hitches are typically used to couple a vehicle, such as a car or truck, to a trailer carrying some form of cargo. The vehicle typically includes a receiver in which a portion of the trailer hitch is received to couple the trailer hitch to the vehicle. Some trailer hitches include a spherical trailer ball that engages a tongue coupled to the trailer. To secure the trailer to the trailer hitch, an operator typically makes several attempts or approaches to properly align the trailer hitch and trailer tongue by moving the vehicle in reverse to align the trailer hitch with the trailer, exiting the vehicle to confirm alignment, and then repeating as necessary. Once properly aligned, trailer hitch systems utilize a manual crank to lift and lower the trailer tongue to engage or disengage the trailer ball. Using the manual crank is labor-intensive, often demanding considerable physical strength to operate. Moreover, operating the trailer crank in such close proximity to the connection can pose various risks to the operator, such as the pinching or crushing of digits and/or limbs. If the crank is coupled or mounted to the trailer, it can only be used for that trailer, necessitating a crank on each trailer. For at least these reasons, coupling a trailer to a vehicle is often time-consuming, labor-intensive, and potentially dangerous to the operator. The present disclosure is directed to solving these and other problems.

SUMMARY

According to some implementations of the present disclosure, a trailer hitch system for coupling a vehicle to a trailer includes a housing; a shaft coupled to the housing and being configured to be received within a receiver coupled to the vehicle; a mounting plate including a swing arm extending therefrom, the swing arm being coupled to the housing such that the swing arm can pivot relative to the housing; and an actuator coupled to (i) the housing such that the actuator can pivot relative to the housing and (ii) the swing arm such that movement of the actuator causes corresponding movement of the swing arm between a first position and a second position.

According to some implementations of the present disclosure, a powered trailer hitch system for coupling a trailer to a vehicle includes a mounting plate including a pair of swing arms extending therefrom; a trailer ball assembly coupled to the mounting plate, the trailer ball assembly including a trailer ball configured to engage a portion of the trailer; a housing having a base portion, a first side portion, and a second side portion, the first side portion and the second side portion extending from the base portion, the housing being coupled to the pair of swing arms such that the pair of swing arms can pivot relative to the housing; a shaft coupled to the housing, the shaft being configured to couple the trailer hitch system to the vehicle; and an actuator including a cylinder and a piston, the piston being configured to move relative to the cylinder, the cylinder being coupled to the housing, the piston being coupled to the pair of swing arms such that movement of the piston relative to the cylinder causes corresponding movement of the pair of swing arms between a first position and a second position.

According to some implementations of the present disclosure, a method for coupling a trailer to a vehicle using a powered trailer hitch system includes positioning a trailer ball of the powered trailer hitch system generally below a coupling mechanism of the trailer, the powered trailer hitch system including a mounting plate, a swing arm, a housing, and an actuator, the swing arm being coupled to the housing at a first pivot point, the actuator being coupled to the housing at a second pivot point and the actuator being coupled to the swing arm, the actuator being configured to selectively cause the swing arm to move between a retracted position and an extended position; receiving, using a controller, a first user input indicative of a desire to move the swing arm towards the extended position; and in response to receiving the first user input, actuating, via the controller, the actuator of the trailer hitch to automatically move the swing arm towards the extended position until the trailer ball engages the tongue coupled to the trailer.

The above summary is not intended to represent each embodiment or every aspect of the present invention. Additional features and benefits of the present invention are apparent from the detailed description and figures set forth below.

BRIEF DESCRIPTION OF THE DRAWINGS

FIG. 8C is a side view of the trailer hitch system of FIG. 1, the vehicle, and the trailer during the final step of the method of FIG. 7 according to some implementations of the present disclosure;

FIGS. 11A-11B are partial exploded perspective views of a trailer hitch system according to some implementations of the present disclosure;

FIG. 13 is a side view of some implementations of the trailer hitch system of FIG. 1 including an adapter sleeve according to some implementations of the present disclosure.

Figure 1:
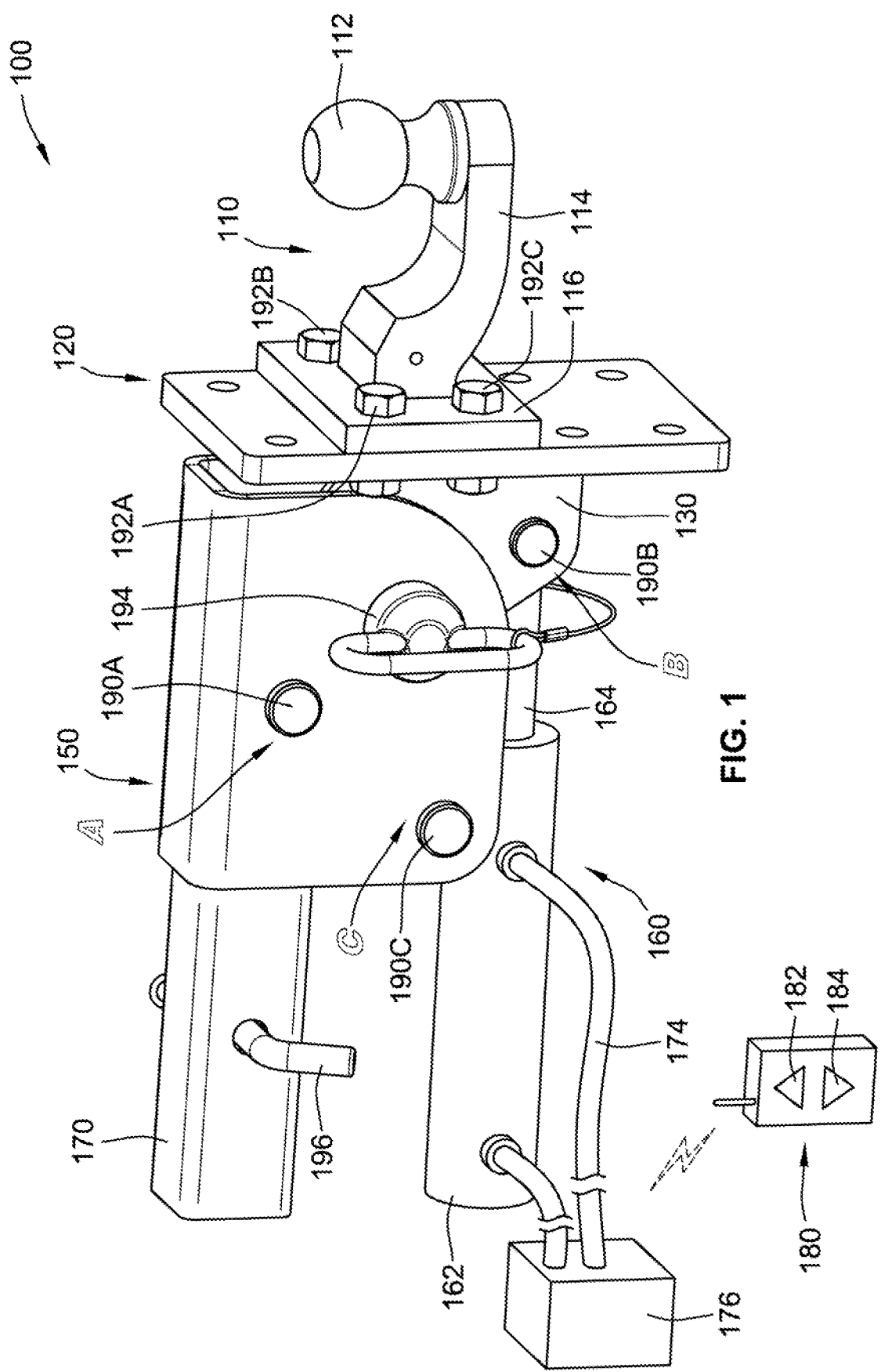
FIG. 1 is an assembled perspective view of an exemplary trailer hitch system according to some implementations of the present disclosure.

While the disclosure is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The presently described inventions can be implemented in many different forms. Representative implementations are shown in the drawings, and will herein be described in detail. The present disclosure provides an example or illustration of the principles of the present inventions, and is not intended to limit the broad aspects of the present inventions to the implementations illustrated. To the extent elements, and limitations that are disclosed, for example, in the Abstract, Summary, and Detailed Description sections, but not explicitly set forth in the claims, they should not be incorporated into the claims, singly or collectively, by implication, inference, or otherwise.

For purposes of the present detailed description, the singular includes the plural and vice versa, unless specifically disclaimed; the word "or" shall be both conjunctive and disjunctive; the word "all" means "any and all"; the word "any" means "any and all"; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof. Additionally, the singular terms "a," "an," and "the" include plural referents unless context clearly indicates otherwise.

Figure 2:
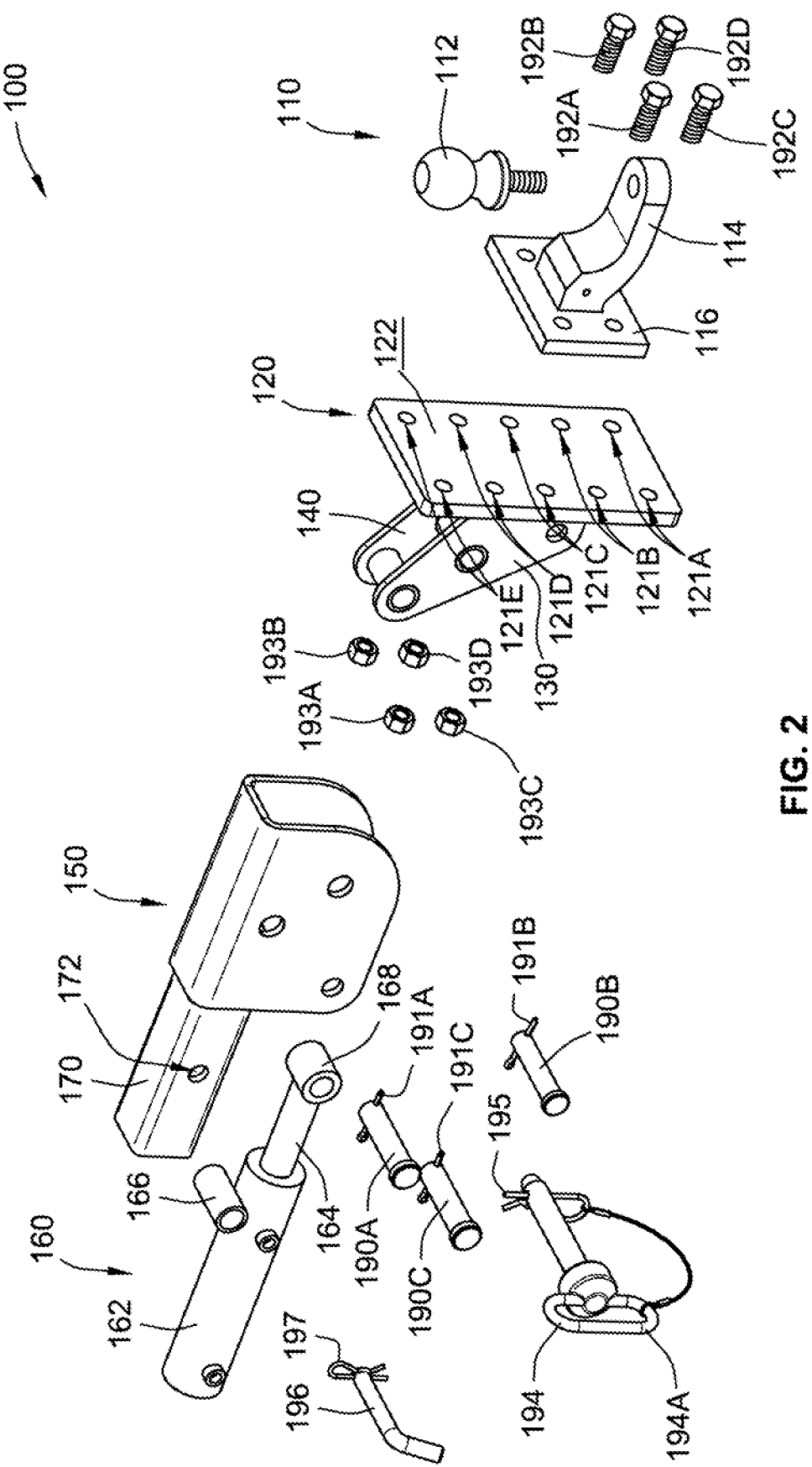
FIG. 2 is an exploded perspective view of the trailer hitch system of FIG. 1 according to some implementations of the present disclosure.

Referring generally to FIGS. 1 and 2, a trailer hitch system 100 includes a trailer ball assembly 110, a mounting plate 120, a first swing arm 130, a second swing arm 140, a housing 150, an actuator 160, a mounting shaft 170, and a controller 180. The trailer hitch system 100 is generally used to couple a trailer to a vehicle such that the vehicle can, for example, transport or tow the trailer from a first location to a second location. As described in further detail herein, the actuator 160 causes movement of the first swing arm 130 and the second swing arm 140, which in turn causes the trailer ball assembly 110 to engage a coupling mechanism (e.g., tongue) on the trailer.

The trailer ball assembly 110 includes a trailer ball 112, arm portion 114, and mounting portion 116. The trailer ball 112 has a generally spherical shape and is generally sized and shaped to engage a receiver of a trailer (not shown) to aid in coupling the vehicle and the trailer. More generally, the trailer ball 112 can have any suitable size and/or shape to aid in securely engaging the trailer to the trailer hitch system 100. The trailer ball 112 is coupled to the arm portion 114, which in turn is coupled to the mounting portion 116. As shown, the trailer ball 112 is coupled to the arm portion 114 via a threaded connection. Advantageously, using a threaded connection to couple the trailer ball 112 to the arm portion 114 permits a user to remove the trailer ball 112 and couple a different trailer ball with a different size and/or shape as the trailer ball 112 to the arm portion 114 such that the trailer hitch system 100 can be used with different trailer configurations. Alternatively, in some implementations, the trailer ball 112 and the arm portion 114 can be coupled using other mechanisms (e.g., welded together), or alternatively still, the trailer ball 112 and the arm portion 114 can be unitary and/or monolithic. As shown, the mounting portion 116 has a generally rectangular shape and includes has a plurality of apertures (e.g., four) for receiving fasteners therein to aid in coupling the mounting portion 116 to the mounting plate 120, as described in further detail herein.

While the system 100 has been shown and described herein as including trailer ball 110, in some implementations, the system 100 includes a pintle hook instead of the trailer ball 110. In such implementations, the pintle hook performs the same or similar function as the trailer ball 110 in that the pintle hook aids in coupling the vehicle to the trailer. Moreover, in some implementations, the system 100 includes a combination of the trailer ball 110 and a pintle hook. In such implementations, the pintle hook is moveable relative to the trailer ball 110 between a first position and a second position such that the pintle hook is in contact with an upper surface or portion of the trailer ball 110 to aid in securing the trailer to the vehicle when in the second position.

Figure 3:
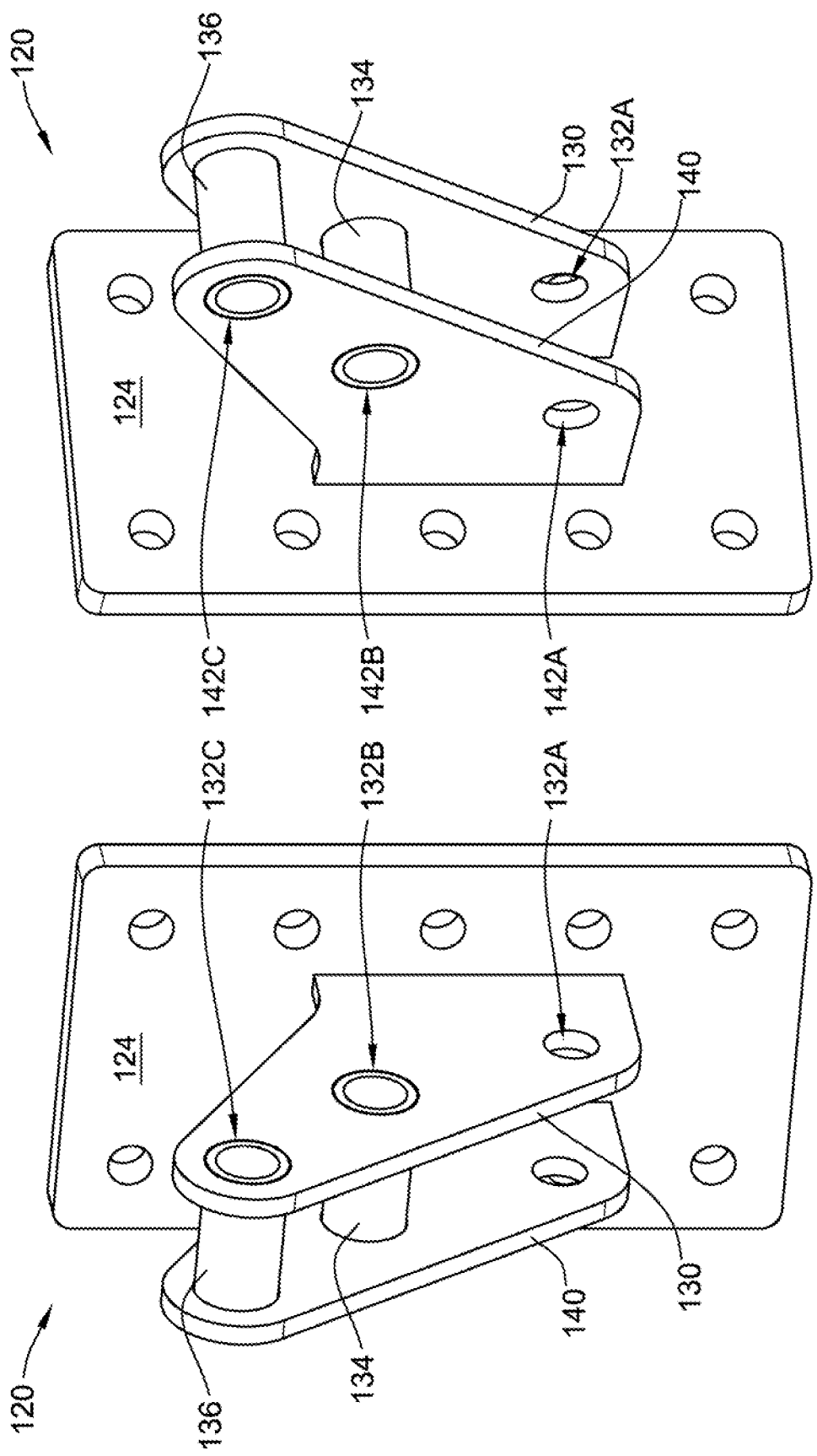
FIG. 3A is a perspective view of a mounting plate and swing arms of the trailer hitch system of FIG. 1 according to some implementations of the present disclosure.
FIG. 3B is another perspective view of the mounting plate and swing arms of the trailer hitch system of FIG. 1 according to some implementations of the present disclosure.

The mounting plate 120 has a generally rectangular shape and includes a front surface 122 (FIG. 2) and a rear surface 124 (FIG. 3A). As shown in FIG. 2, the mounting plate 120 includes pairs of apertures 121A-121E extending between the front surface 122 and the rear surface 124. Each aperture in each of the pairs of apertures 121A-121E is configured to receive therein one of a plurality of bolts 192A-192D (FIG. 2) for coupling the trailer ball assembly 110 to the mounting plate 120. To couple the trailer ball assembly 110 to the mounting plate 120, a first pair of apertures in the mounting portion 116 of the trailer ball assembly is aligned with one of the pairs of apertures 121A-121E of the mounting plate 120, and a second pair of apertures in the mounting portion 116 of the trailer ball assembly 110. Once aligned, the bolts 192A-192D are inserted through the apertures in the mounting portion 116 of the trailer ball assembly 110 and the two corresponding pairs of apertures 121A-121E. Corresponding nuts 193A-193D are then threaded onto the bolts 192A-192D to aid in securing the mounting portion 116 of the trailer ball assembly 110 to the mounting plate 120.

Advantageously, the position of the trailer ball 112 relative to the upper and lower ends of the mounting plate 120 can be adjusted by changing which two pairs of apertures 121A-121E the mounting portion 116 of the trailer ball assembly 110 is coupled to. For example, the mounting portion 116 of the trailer ball assembly 110 can be coupled to the mounting plate 120 through aperture pair 121A and aperture pair 121B, through aperture pair 121B and aperture pair 121C, through aperture pair 121C and aperture pair 121D, or through aperture pair 121D and aperture pair 121E. Thus, the trailer ball assembly 110 can be removed from the mounting plate 120 and repositioned as desired for a given application. While the mounting plate 120 is shown as including 5 pairs of apertures 121A-121D, in some implementations, the mounting plate 120 has more or less pairs of apertures (e.g., one, two, four, six, ten, etc.) Similarly, while the mounting portion 116 of the trailer ball assembly 110 is shown as including four apertures (FIG. 2), more or less pairs of apertures are possible (e.g., one, four, six, etc.)

In some implementations, the mounting portion 116 of the trailer ball assembly 110 is welded to the mounting plate 120 such that the bolts 192A-192D and corresponding nuts 193A-193C are unnecessary. In other implementations, the mounting portion 116 of the trailer ball assembly 110 and the mounting plate 120 are unitary and/or monolithic. However, in both these alternative implementations, a user cannot change the position of the trailer ball 112 relative to the mounting plate 120.

As shown in FIGS. 3A and 3B, the first swing arm 130 and the second swing arm 140 are coupled to and extend from the rear surface 124 of the mounting plate 120. The first swing arm 130 and/or the second swing arm 140 can be coupled to the mounting plate 120 using, for example, a welded connection. Alternatively, in some implementations, the first swing arm 130, the second swing arm 140, and the mounting plate 120 are unitary and/or monolithic.

Referring FIG. 3A, the first swing arm 130 includes a first aperture 132A, a second aperture 132B, and a third aperture 132C. Referring to FIG. 3B, the second swing arm 140 is the same as, or similar to, the first swing arm 130 and includes a first aperture 142A, a second aperture 142B, and a third aperture 142C. As shown, the first aperture 132A of the first swing arm 130 is generally aligned with the first aperture 142A of the second swing arm 140, the second aperture 132B of the first swing arm 130 is generally aligned with the second aperture 142B of the second swing arm 140, and the third aperture 132C of the first swing arm 130 is generally aligned with the third aperture 142C of the second swing arm 140. As described in further detail herein, the apertures 132A-132C of the first swing arm 130 and the apertures 142A-142C are used to couple to the first swing arm 130 and the second swing arm 140 to the housing 150 and the actuator 160.

In some implementations, a first bushing 134 is disposed within the second aperture 132B of the first swing arm 130 and the second aperture 142B of the second swing arm 140, and a second bushing 136 is disposed within the third aperture I32C of the first swing arm 130 and the third aperture 142C of the second swing arm 140. As described in further detail herein, the first swing arm 130 and the second swing arm 140 are coupled to the housing 150, and the first bushing 134 and the second bushing 136 aid in permitting (or inhibiting) the first swing arm 130 and the second swing arm 140 to move (e.g., pivot) relative to the housing 150.

While the trailer hitch system 100 is shown and described herein as including a pair of swing arms (first swing arm 130 and second swing arm 140), in some implementations, the trailer hitch system 100 includes more or less swing arms. For example, an alternative trailer hitch system (not shown) can include one swing arm, three swing arms, five swing arms, or any other suitable number of swing arms, each of which is the same as, or similar to, the first swing arm 130 and/or the second swing arm 140 described herein.

Figure 4:
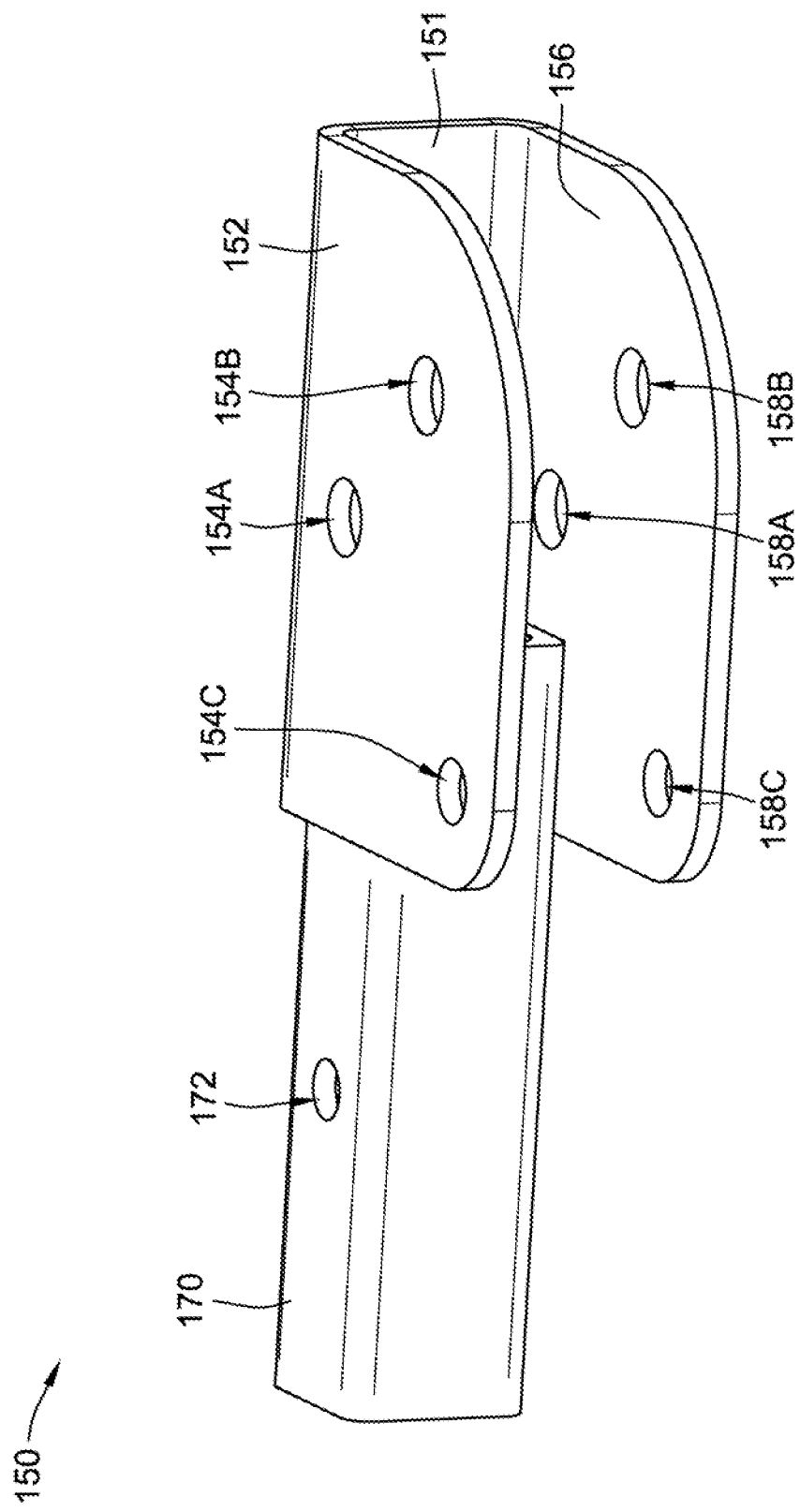
FIG. 4 is a perspective view of a housing of the trailer hitch system of FIG. 1 according to some implementations of the present disclosure.

Referring to FIG. 4, the housing 150 includes a base portion 151, a first side portion 152, and a second side portion 156. As shown, the first side portion 152 and the second side portion 156 are coupled to, and extend from, the base portion 151. The base portion 151, the first side portion 152, and the second side portion 156 can be unitary and/or monolithic, or coupled together (e.g., welded together). The first side portion 152 includes a first aperture 154A, a second aperture 154B, and a third aperture 154C. Similarly, the second side portion 156 includes a first aperture 158A, a second aperture 158B, and a third aperture 158C. As shown, the first aperture 154A of the first side portion 152 is generally aligned with the first aperture 158A of the second side portion 156, the second aperture 154B of the first side portion 152 is generally aligned with the second aperture 158B of the second side portion 156, and the third aperture 154C of the first side portion 152 is generally aligned with the third aperture 158C of the second side portion 156.

The shaft 170 is coupled to the base portion 151 of the housing 150 and extends therefrom. The shaft 170 has a generally rectangular profile and is used to couple the trailer hitch system 100 to a vehicle (e.g., a car, a truck, etc.) Specifically, a portion of the shaft 170 is received within a receiver coupled to the vehicle (e.g., coupled to the vehicle bumper or to the vehicle frame). To aid in preventing movement of the shaft 170 relative to the receiver (e.g., such that the shaft 170 does not slide out when the vehicle is moving), the shaft 170 includes an aperture 172 (FIG. 4) extending therethrough. The aperture 172 (FIG. 4) is sized and shaped to receive therein a mating pin 196 (FIG. 1). The mating pin 196 can be inserted through the aperture 172 and a corresponding, aligned aperture in the receiver (not shown) to aid in preventing movement of the shaft 170 relative to the receiver. As shown in FIG. 2, the mating pin 196 can include a cotter pin 197 having a general "R" shape (also referred to as an "R-clip") that can be inserted into an aperture in the mating pin 196 to aid in inhibiting the mating pin 196 from sliding out of the aperture 172 (e.g., as the vehicle is moving). In some aspects, the mating pin 196 can include a lynch pin (or some type of locking mechanism) to aid in inhibiting the mating pin 196 from sliding out of the aperture 172.

Referring back to FIG. 2, the actuator 160 includes a cylinder 162, a piston 164, a rear pivot sleeve 166, and a forward pivot sleeve 168. The piston 164 is partially disposed within the cylinder 162 and is moveable relative to the cylinder 162 between a retracted position and an extended position. The actuator 160 can be a hydraulic actuator that uses fluid (e.g., liquid) to move the piston 164 relative to the cylinder 162 (e.g., by opening or closing a valve to create a pressure differential). Alternatively, the actuator 160 can be a pneumatic actuator that uses compressed fluid (e.g., compressed air or another compressed gas) to move the piston 164 relative to the cylinder 162. For these hydraulic and pneumatic actuators, the trailer hitch system 100 can further include fluid transfer line(s) 174 and a fluid reservoir 176 (e.g., a reservoir for holding the hydraulic fluid; a tank for storing the compressed gas or compressed air). The fluid transfer line 174 is in fluid communication with the cylinder 162 of the actuator 160 and the fluid reservoir 176 and can selectively deliver fluid (e.g., compressed gas, hydraulic fluid, etc.) between the fluid reservoir 176 and the cylinder 162 (e.g., using a valve) to cause the piston 164 to extend and/or retract relative to the cylinder 162 of the actuator 160. In some implementations, it is contemplated that fluid delivery may occur using a pump in the case of a hydraulic actuator, or valve for regulating compressed gas from a pressurized gas storage tank or an air compressor for a pneumatic actuator. It is contemplated that the actuator 160 may further include an electric motor (e.g., 12V or 24V) for assisting (e.g., operating the pump, valve, or compressor) with the fluid delivery operations.

The rear pivot sleeve 166 is coupled to the cylinder 162. As described in further detail herein, the actuator 160 is coupled to the housing 150 via the rear pivot sleeve 166 such that the actuator 160 can pivot relative to the housing 150. The forward pivot sleeve 168 is coupled (e.g., welded, otherwise secured) to an end of the piston 164. As described in further detail herein, the actuator 160 is coupled to the first swing arm 130 and the second swing arm 140 via the forward pivot sleeve 168 such that movement of the piston 164 relative to the cylinder 162 causes corresponding movement of the first swing arm 130 and the second swing arm 140 relative to the housing 150.

In some implementations, the actuator 160 can be an electro-mechanical actuator (e.g., a ball screw) in which a voltage differential causes the actuator 160 to extend and retract, for example, an arm such as the piston 164. In one non-limiting example, the actuator 160 can be a Heavy Duty Linear Actuator manufactured by Progressive Automations, model number PA-17, which has a stroke length between about 1 inch and about 24 inches, and can push and pull approximately 2,000 lbs. In such implementations, the electro-mechanical actuator 160 can be powered by, for example, the battery of the vehicle to which the trailer hitch system 100 is coupled via the shaft 170. Advantageously, such implementations do not require the fluid reservoir 176 like a hydraulic or pneumatic actuator.

Referring to FIG. 1, when the trailer hitch system 100 is assembled, the trailer ball assembly 110 is coupled to the mounting plate 120, the first swing arm 130 and the second swing arm 140 (FIG. 2) are coupled to the housing 150, and the actuator 160 is coupled to the housing 150. The first swing arm 130 and the second swing arm 140 are coupled to the housing 150 at a first pivot point A. Specifically, the third aperture 132C of the first swing arm 130 (FIG. 3A), the third aperture 142C of the second swing arm 140 (FIG. 3B), the first aperture 154A of the first side portion 152 (FIG. 4), and the first aperture 158A of the second side portion 156 (FIG. 4) are aligned within one another. A fastener 190A (FIGS. 1 & 2) is inserted through the first aperture 154A, the first aperture 158A, and the second bushing 136 (FIGS. 3A & 3B) to couple the first swing arm 130 and the second swing arm 140 to the housing 150. The fastener 190A includes a cotter pin 191A that is the same as, or similar to, the cotter pin 197 describe above, and aids in inhibiting the fastener 190A from sliding out. While the fastener 190A is shown as being unthreaded in FIG. 2, alternatively, the fastener 190A can be fully threaded or partially threaded (e.g., a shoulder bolt). Alternatively still, the fastener 190A can include a snap ring and groove that is configured for the same or similar function as the cotter pin 191A.

The actuator 160 is coupled to both the housing 150 and the first swing arm 130 and the second swing arm 140. First, the rear pivot sleeve 166 coupled to the cylinder 162 (FIG. 2) is aligned with the third aperture 154C of the first side portion 152 of the housing 150 (FIG. 4) and the third aperture 158C of the second side portion 156 of the housing 150 (FIG. 4). A fastener 190C (which includes a cotter pin 191C) that is the same as, or similar to, the fastener 190A described above is inserted through the rear pivot sleeve 166, the third aperture 154C and the third aperture 158C such that the actuator 160 is coupled to the housing 150 and can pivot relative to the housing 150 about a third pivot point C (FIG. 1). Second, the forward pivot sleeve 168 coupled to the piston 164 (FIG. 2) is aligned with the first aperture 132A of the first swing arm 130 (FIG. 3A) and the first aperture 142A of the second swing arm 140 (FIG. 3B). A fastener 190B (which includes a cotter pin 191B) that is the same as, or similar to, the fastener 190A and/or the fastener 190C described above is inserted through the first aperture 132A of the first swing arm 130 (FIG. 3A), the forward pivot sleeve 168 of the actuator (FIG. 2), and the first aperture 142A of the second swing arm 140 (FIG. 3B) such that the actuator 160 is coupled to the first swing arm 130 and the second swing arm 140, and can pivot relative to the first swing arm 130 and the second swing arm 140 about a second pivot point B (FIG. 1).

In the fully assembled state with the trailer hitch system 100 secured in a transport position, as generally shown in FIG. 1, a mating pin 194 is inserted through the second aperture 154B of the first side portion 152 of the housing 150 (FIG. 4), the second aperture 132B of the first swing arm 130 (FIG. 3A), the first bushing 134 (FIG. 3A & 3B), the second aperture 142B of the second swing arm 140 (FIG. 3B), and the second aperture 158E of the second side portion 156 of the housing 150 (FIG. 4). The mating pin 194 is similar to the fasteners 190A-190C described above in that the mating pin 194 includes a cotter pin 195 (FIG. 2), linch pin, or similar locking pin(s). The mating pin 194 differs from the fasteners 190A-190C in that the mating pin 194 includes a handle 194A to aid a user in grasping the mating pin 194 to insert and/or remove the mating pin 194. When inserted as shown in FIG. 1, the mating pin 194 aids in inhibiting movement of the first swing arm 130 and the second swing arm 140 relative to the housing 150.

Figure 5:
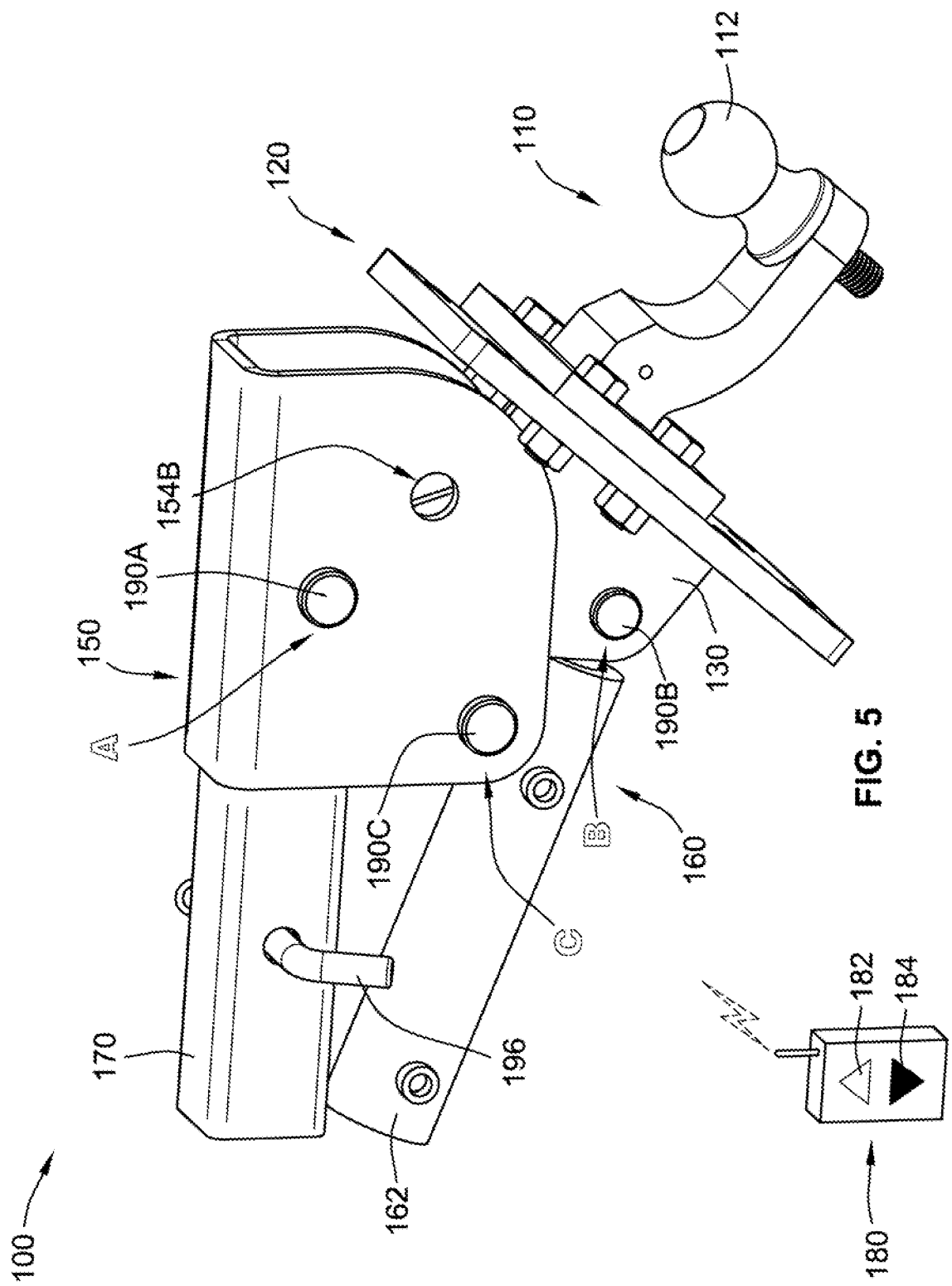
FIG. 5 is a side view of the trailer hitch system of FIG. 1 with the swing arms in a first position according to some implementations of the present disclosure.

Referring to FIG. 5, the trailer hitch system 100 is shown with the first swing arm 130 and the second swing arm 140 in a first position. In this position, the piston 164 (FIG. 2) of the actuator 160 is in a fully retracted position relative to the cylinder 162. As shown by a comparison to FIG. 1 and/or FIG. 5, the trailer ball assembly 110 is angled downward relative to the housing 150. As described in further detail herein, angling the trailer ball assembly 110 downward aids in positioning the trailer ball 112 underneath a coupling mechanism (e.g., tongue) coupled to the trailer. Further, the mating pin 194 (FIG. 1) is not inserted through the housing 150 and the first swing arm 130 and the second swing arm 140 because in this position, the second aperture 154B of the first side portion 152 and the second aperture 158B of the second side portion 156 of the housing 150 (FIG. 4) are not aligned with the second aperture 132B of the first swing arm 130 (FIG. 3A) and the second aperture 142B of the second swing arm 140 (FIG. 3B).

Figure 6:
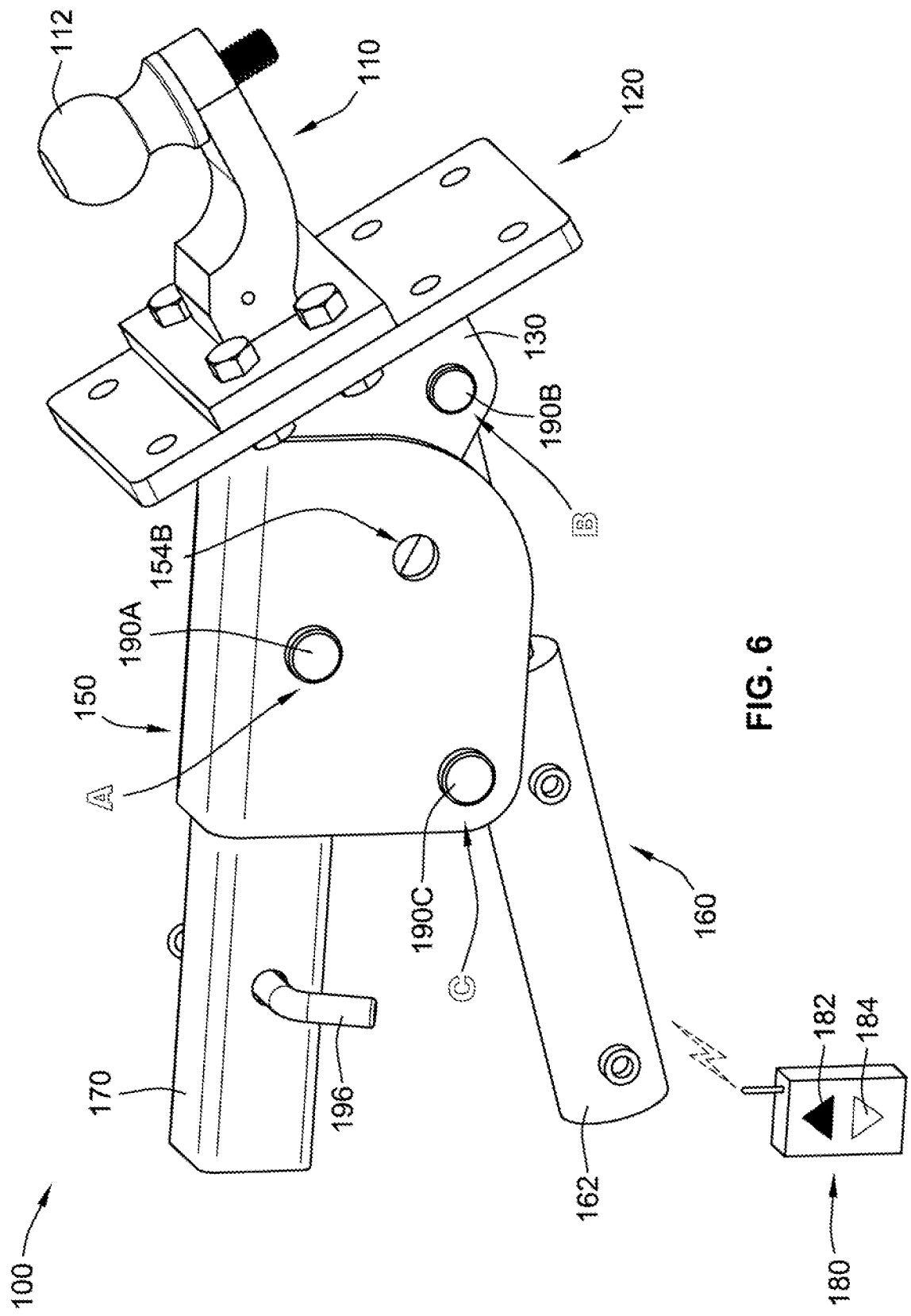
FIG. 6 is a side view of the trailer hitch system of FIG. 1 with the swing arms in a second position according to some implementations of the present disclosure.

Referring to FIG. 6, the trailer hitch system 100 is shown with the first swing arm 130 and the second swing arm 140 in a second position. In this position, the piston 164 (FIG. 2)

of the actuator is in a fully extended position relative to the cylinder 162. As shown by a comparison to FIG. 1 and/or FIG. 4, the trailer ball assembly is angled upward relative to the housing 150. Further, the mating pin 194 (FIG. 1) is not inserted through the housing 150 and the first swing arm 130 and the second swing arm 140 because in this position, the second aperture 154B of the first side portion 152 and the second aperture 158B of the second side portion 156 of the housing 150 (FIG. 4) are not aligned with the second aperture 132B of the first swing arm 130 (FIG. 3A) and the second aperture 142B of the second swing arm 140 (FIG. 3B).

The controller 180 (FIG. 1) is used to move the first swing arm 130 and the second swing arm 140 between the first position (FIG. 5) and the second position (FIG. 6) as desired. Specifically, the controller 180 (FIG. 1) is communicatively coupled to the actuator 160 (e.g., by a wireless connection or a wired connection). The controller 180 causes the piston 164 of the actuator 160 (FIG. 2) to move between the retracted position and the extended position relative to the cylinder 162 (e.g., by opening or closing a valve), and thus causes the first swing arm 130 and the second swing arm 140 to move between the first position (FIG. 5) and the second position (FIG. 6). The controller 180 includes a first user input 182 and a second user input 184. Responsive to a user selecting the first user input 182 (e.g., by pressing and holding the first user input 182), the controller 180 causes the first swing arm 130 and the second swing arm 140 to move towards the second position (FIG. 6). Conversely, responsive to the user selecting the second user input 184 (e.g., by pressing and holding the second user input 184), the controller 180 causes the first swing arm 130 and the second swing arm 140 to move towards the first position (FIG. 5). In this manner, the user/operator can position the trailer ball 112 as desired. During movement between the first position (FIG. 5) and the second position (FIG. 6), and vice versa, the first swing arm 130 and the second swing arm 140 pivot relative to the housing 150 at the first pivot point A (FIG. 1). At the same time, the actuator 160 pivots relative to the first swing arm 130 and second swing arm 140 at the second pivot point B (FIGS. 1, 5, and 6) and relative to the housing at third pivot point C (FIGS. 1, 5, and 6). That is, the trailer hitch system 100 includes up to three pivot points, A, B, C, at which the various components pivot relative to the housing 150 and swing arm(s) 130, 140.

As shown in FIG. 1, the controller 180 can be a hand-held remote control. Alternatively, the controller 180 can be coupled to the vehicle and/or the trailer (not shown in FIG. 1). For example, the controller 180 can be coupled on an exterior portion of the vehicle (e.g., at or near the rear of the vehicle), or inside of the vehicle (e.g., such that a driver can operate the controller 180 while sitting in the cab). Alternatively, the controller 180 can be integrated into a handheld device or as an on-board component of a computing device. In some examples, the controller can be integrated into a smartphone (e.g., the controller 180 is smartphone that includes an application communicatively coupled to the actuator 160 and providing a graphical user interface).

Figure 7:
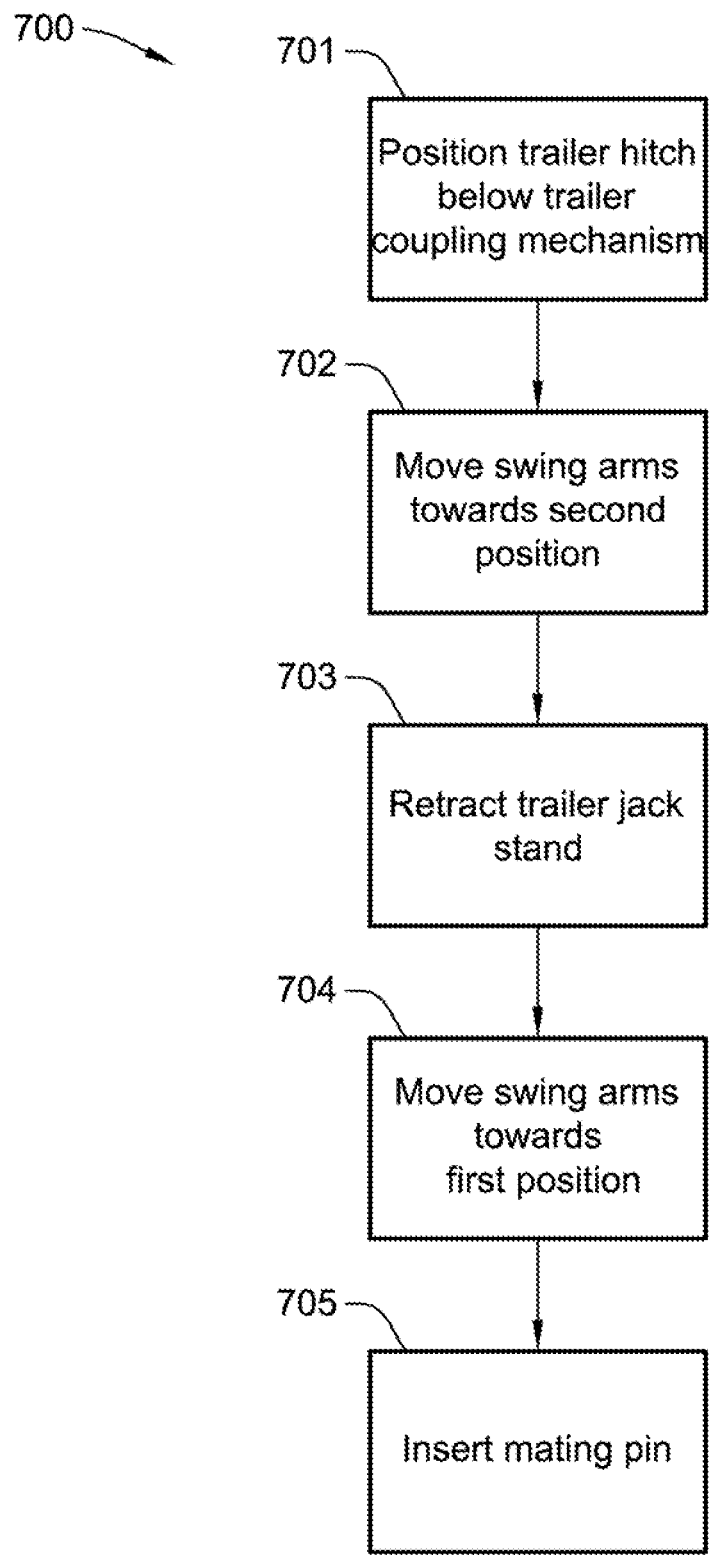
FIG. 7 is a process flow diagram illustrating an exemplary method of coupling a trailer to a vehicle using the trailer hitch system of FIG. 1 according to some implementations of the present disclosure.

Referring to FIG. 7, a method 700 for coupling a vehicle to a trailer using the trailer hitch system 100 (FIGS. 1-6) is illustrated. Alternatively, the method 700 can be used to couple the vehicle to the trailer using trailer hitch systems that are similar to the trailer hitch system 100 (e.g., the trailer hitch system 200 or 400 shown in FIGS. 9-12 and described in further detail herein).

Figure 8A:
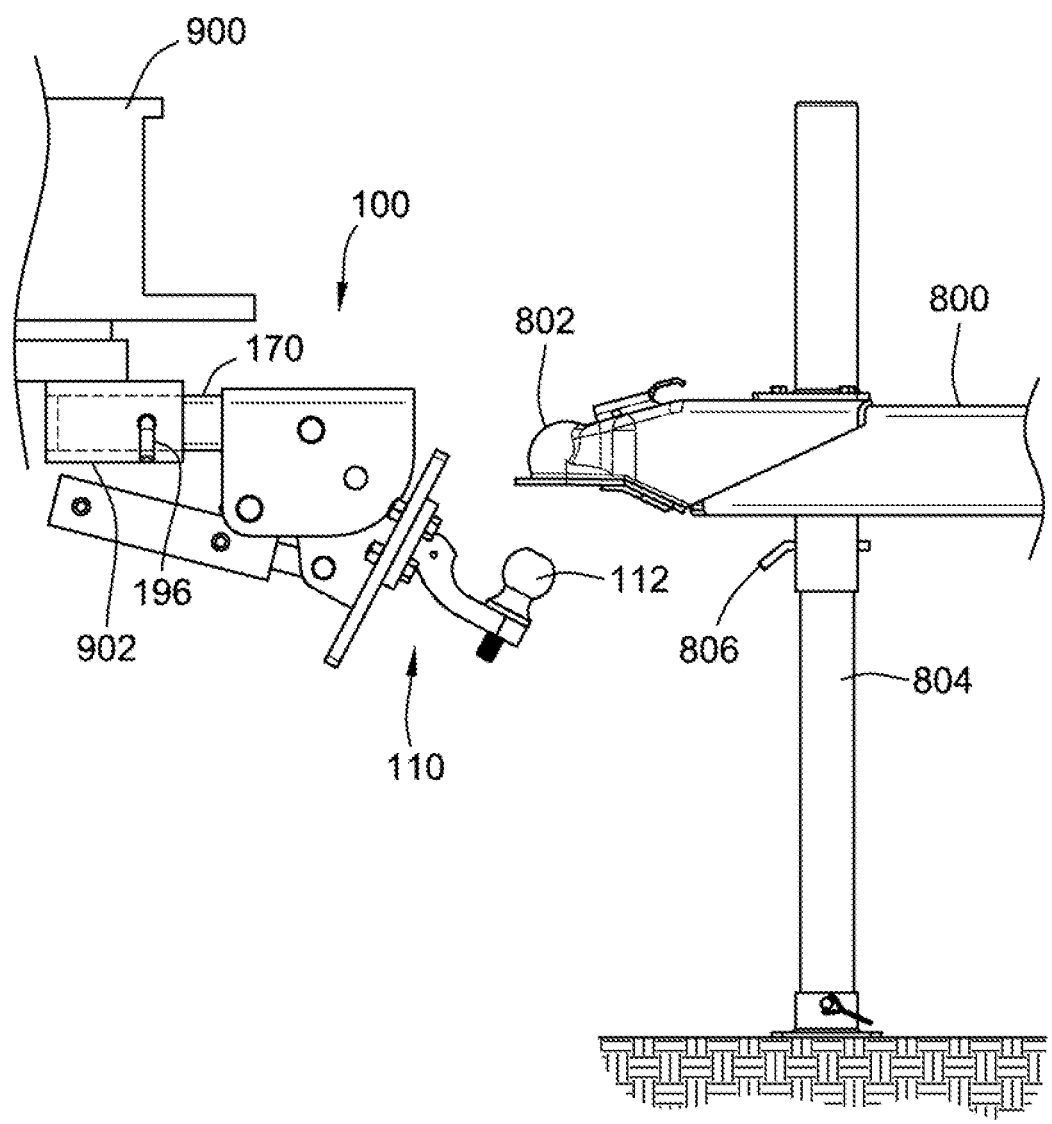
FIG. 8A is a side view of the trailer hitch system of FIG. 1, a vehicle, and a trailer during one step of the method of FIG. 7 according to some implementations of the present disclosure.

Step 701 of the method 700 includes positioning the trailer ball 112 of the trailer hitch system 100 generally below an adjacent to the trailer. Referring to FIG. 8A, during step 701, an operator positions the trailer ball 112 of the trailer hitch system 100 below a coupling mechanism 802 of a trailer 800. The trailer hitch system 100 is coupled to a vehicle 900. Specifically, the shaft 170 is disposed within a receiver 902 of the vehicle 900 and secured via the pin 196. The coupling mechanism 802 is a tongue that is sized and shaped to engage the trailer ball 112. The operator positions the trailer ball 112 by moving (e.g., backing up) the vehicle to which the trailer hitch system 100 is coupled via the shaft 170. In some implementations, step 701 includes removing the mating pin 194 (FIG. 1) from the housing 150 and the first swing arm 130 and the second swing arm 140 if the mating pin 194 is not already removed so as to permit movement of the first swing arm 130 and the second swing arm 140 relative to the housing 150.

Figure 8B:
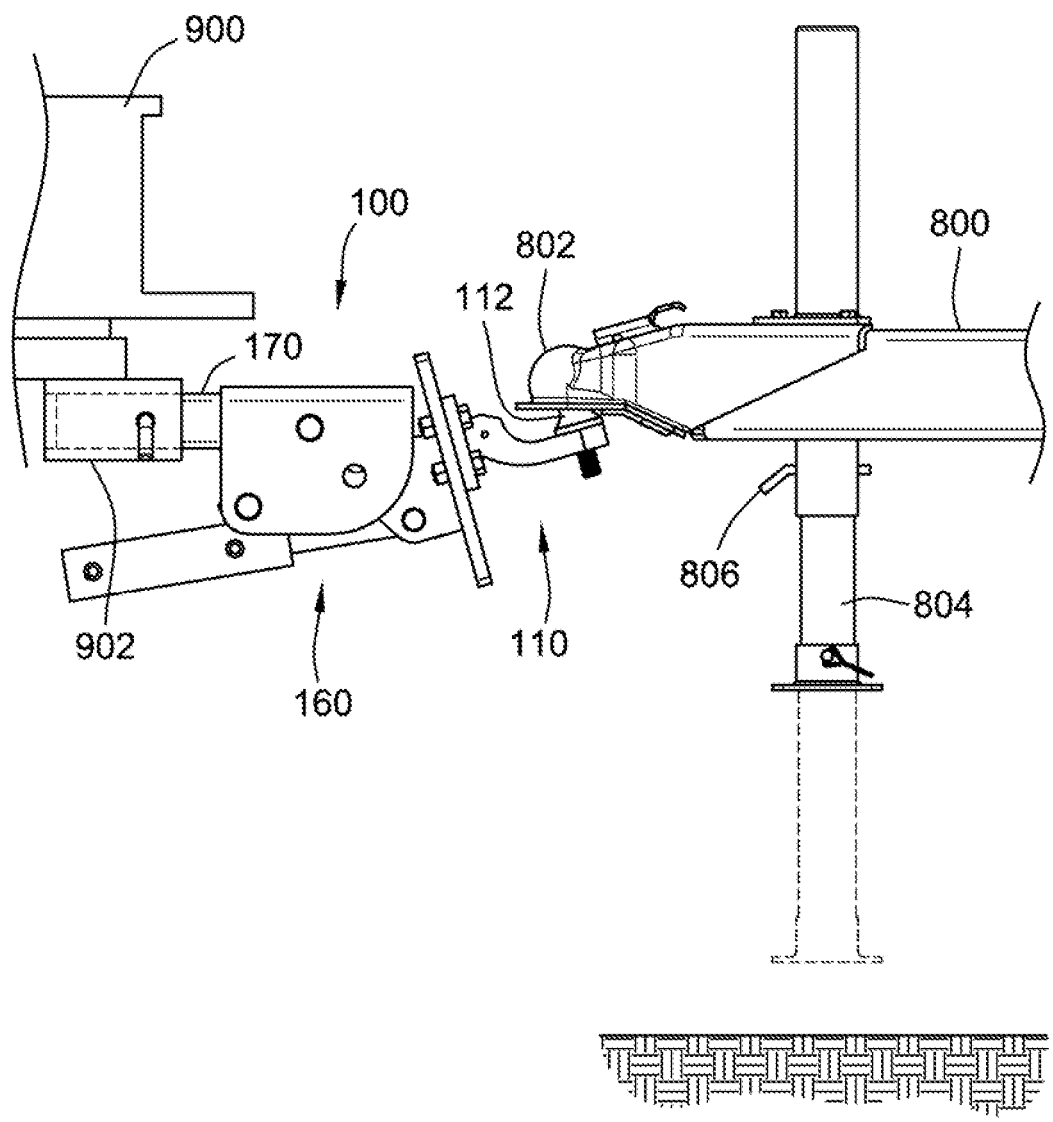
FIG. 8B is a side view of the trailer hitch system of FIG. 1, the vehicle, and the trailer during another step of the method of FIG. 7 according to some implementations of the present disclosure.

Step 702 of the method includes moving the first swing arm 130 and the second swing arm 140, and consequently the trailer ball 112, towards the second position (FIG. 6). The operator causes the first swing arm 130 and the second swing arm 140 to move towards the second position using the controller 180 shown in FIG. 1 (e.g., by pressing and holding the first user input 182). As the first swing arm 130 and the second swing arm 140 move toward the second position (FIG. 6), the trailer ball 112 will engage the coupling mechanism 802 of the trailer 800, as shown in FIG. 8B.

The trailer 800 also includes a jack stand 804 that supports the tongue portion of the trailer 800 when it is not coupled to a vehicle so that the trailer 800 does not tip forward or down. The operator cannot tow the trailer 800 until the jack stand 804 has been retracted. Typically, prior systems required the operator to manually lift a portion of the weight of the trailer 800 (e.g., using a manual crank) to retract the jack stand 804. Step 702 of the method 700 includes continuing to move the first swing arm 130 and the second swing arm 140 towards the second position (FIG. 6) after the trailer ball 112 has engage the coupling mechanism 802 such that the trailer hitch system 100 supports the tongue portion of the trailer 800 so that an operator can retract the jack stand 804. For example, the operator can retract the jack stand 804 by removing a pin 806 and sliding the jack stand 804 upward. Thus, the operator of the trailer hitch system 100 can desirably retract the jack stand 804 without being required to manually raise the tongue portion of the trailer 800 relative to the ground surface via a manual crank system or via alternate manual methods.

Step 703 of the method 700 includes moving the first swing arm 130 and the second swing arm 140 towards the first position (FIG. 5). As described above, the mating pin 194 (FIG. 2) is removed from the first swing arm 130, the second swing arm 140, and the housing to permit movement of the swing arms 130 and 140 relative to the housing 150 during steps 701 and 702. However, the mating pin 194 needs to be reinserted to inhibit this movement during transport of the trailer 800. Thus, during step 703, the operator causes the first swing arm 130 and the second swing arm 140 to move back towards the first position (FIG. 5) using the controller 180 (FIG. 1) (e.g., by pressing and holding the second user input 184). Specifically, the operator causes the first swing arm 130 and the second swing arm 140 to move towards the first position until the second aperture 132B of the first swing arm 130 (FIG. 3A) and the second aperture 142B of the second swing arm 140 (FIG. 3B) are aligned with the second aperture 154B of the first side portion 152 of the housing 150 (FIG. 4) and the second aperture 158B of the second side portion 156 of the housing 150 (FIG. 4). If the operator overshoots the alignment, the operator can use the controller 180 to move the first swing arm 130 and the second swing arm 140 back towards the second position (FIG. 6) so that the apertures can be aligned for the mating pin 194.

Step 704 of the method 700 includes inserting the mating pin 194 through the second aperture 154B of the first side portion 152 of the housing 150 (FIG. 4), the second aperture 132B of the first swing arm 130 (FIG. 3A), the first bushing 134 (FIG. 3A & 3B), the second aperture 142B of the second swing arm 140 (FIG. 3B), and the second aperture 158B of the second side portion 156 of the housing 150 (FIG. 4). Step 704 can also include securing the mating pin 194 using the cotter pin 195 (FIG. 2) (or a lynch pin, for example). With the mating pin 194 inserted, the first swing arm 130 and the second swing arm 140 are inhibited from moving relative to the housing 150 (e.g., the first swing arm 130 and the second swing arm 140 are locked or secured), and the vehicle can now tow the trailer 800. As shown in FIG. 8C, with the mating pin 194 inserted, the vehicle 900 can tow the trailer 800 with the hydraulic stress transferred to the mating pin 194.

Figure 9:
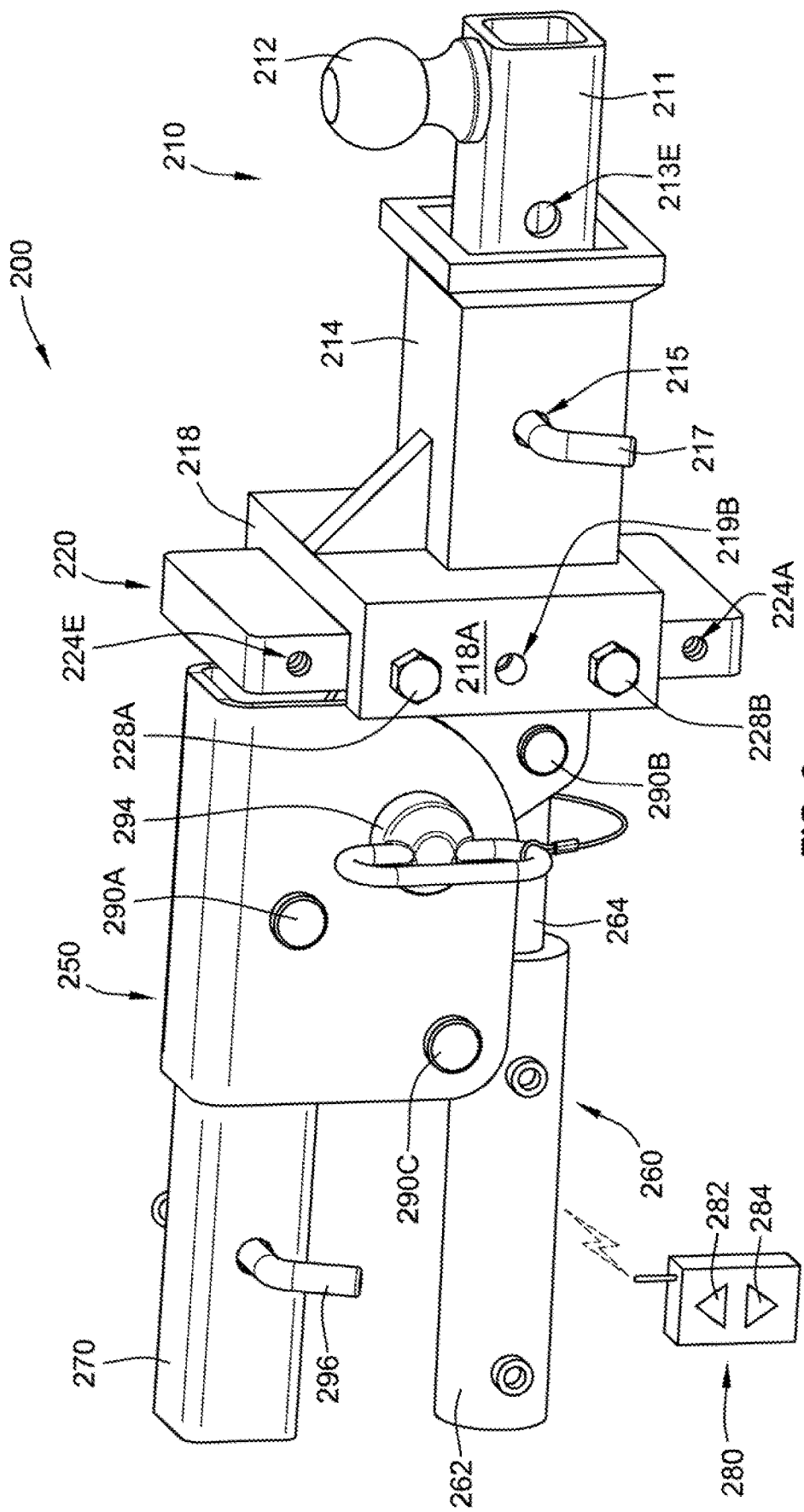
FIG. 9 is an assembled perspective view of a trailer hitch system according to some implementations of the present disclosure.
Figure 10:
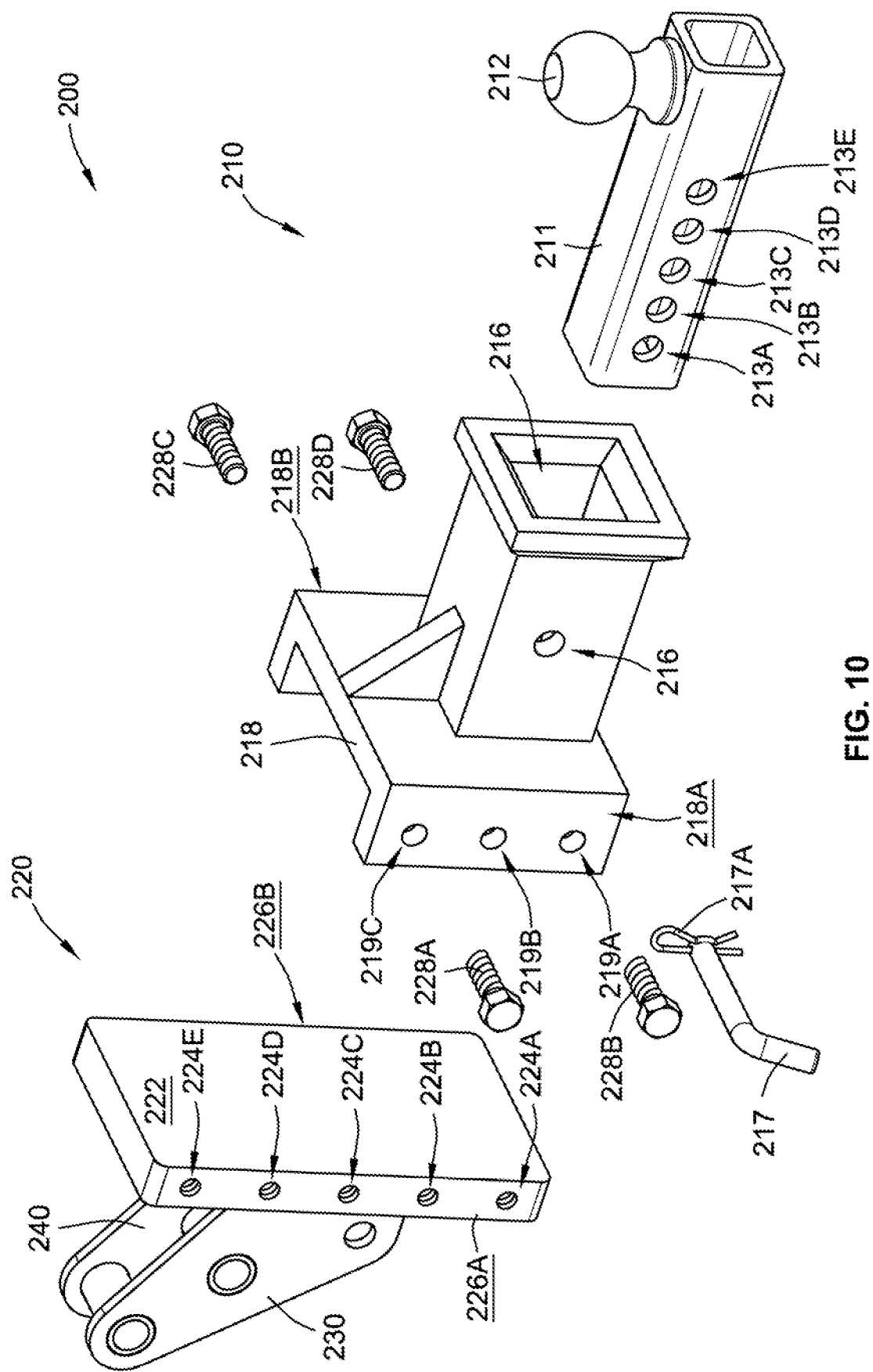
FIG. 10 is a partial exploded perspective view of the trailer hitch system of FIG. 9 according to some implementations of the present disclosure.

Referring generally to FIGS. 9 and 10, a trailer hitch system 200 that is the same as, or similar to, the trailer hitch system 100 (FIGS. 1-6) is shown. The trailer hitch system 200 is shown in an assembled configuration in FIG. 9. The trailer hitch system 200 is similar to the trailer hitch system 100 (FIGS. 1-6) in that the trailer hitch system 200 includes a first swing arm 230 (FIG. 10), a second swing arm 240 (FIG. 10), a housing 250 (FIG. 9), an actuator 260 (FIG. 9), and a shaft 270 (FIG. 9) that are the same as, or similar to, the first swing arm 130, the second swing arm 140, the housing 150, the actuator 160, and the shaft 170 of the trailer hitch system 100 described herein.

Like the trailer hitch system 100 (FIGS. 1-6), the trailer hitch system 200 includes a trailer ball assembly 210. The trailer ball assembly 210 is similar to the trailer ball assembly 110 (FIG. 2) in that the trailer ball assembly 210 includes a trailer ball 212. Referring to FIG. 10, the trailer ball assembly 210 differs from the trailer ball assembly 110 in that the trailer ball assembly 210 includes a rail 211, a receiver portion 214, and a jacket portion 218. The rail 211 has a generally rectangular shape and is coupled to the trailer ball 212 (e.g., via a threaded connection, a welded connection, or the like). The rail 211 includes a plurality of apertures 213A-213E that extend through the rail 211. While the rail 211 is shown as including five apertures 213A-213E, the rail 211 can more generally include any suitable number of apertures (e.g., one, three, six, etc.)

The receiver portion 214 includes an aperture 215 and an opening 216. The opening 216 is generally rectangular and is sized and shaped to receive therein a portion of the rail 211. To couple the rail 211 to the receiver portion 214, a portion of the rail 211 is disposed within the opening 216, and a pin 217 that is the same as, or similar to, the mating pin 196 (FIG. 2) described above is inserted through the aperture 215 and one of the plurality of apertures 213A-213E, as shown in FIG. 9. A cotter pin 217A (FIG. 10) can be used to aid in securing the pin 217 within the aperture 215. In this manner, the relative position of the trailer ball 212 relative to the receiver portion 214 and the jacket portion 218 (and consequently the mounting plate 220) can be adjusted by inserting which of the apertures 213A-213E the pin 217 is inserted through. For example, if the pin 217 is inserted through aperture 213E, the trailer ball 212 and the rail 211 will be in a fully retracted position relative to other components of the trailer ball assembly 210. Conversely, if the pin 217 is inserted through aperture 213A, the trailer ball 212 and the rail 211 will be in a fully extended position relative to the other components of the trailer ball assembly 210. Repositioning the trailer ball 212 relative to the rest of the trailer hitch system 200 can aid in adapting the trailer hitch systems to different coupling mechanism configurations of different trailers, thus expanding the versatility of the trailer hitch system 200.

The jacket portion 218 is coupled to the receiver portion 214 and has a general "U" shape that is sized and shaped to receive therein a portion of the mounting plate 220. The jacket portion 218 and the receiver portion 214 can be coupled together (e.g., via a welded connection), or can be a unitary and/or monolithic component. The jacket portion 218 includes a plurality of apertures 219A-219C. Specifically, the plurality of apertures 219A-219C extend from a first side surface 218A of the jacket portion 218. The jacket portion 218 also includes a plurality of corresponding apertures that are the same as, or similar to, the plurality of apertures 219A-219C that extend through an opposing second side surface 218B (FIG. 10) of the jacket portion 218.

The mounting plate 220 is similar to the mounting plate 120 (FIGS. 1-6) in that the mounting plate 220 includes a plurality of apertures 224A-224E. The mounting plate 220 differs from the mounting plate 120 (FIGS. 1-6) in that the plurality of apertures 224A-224E extend from a first side surface 226A of mounting plate 220 towards an opposing second side surface 226B, rather than from a front surface 222 towards a rear surface. The plurality of apertures 224A-224E are generally the same size and shape as the plurality of apertures 219A-219C of the jacket portion 218. The mounting plate 220 also includes a plurality of corresponding apertures that are the same as, or similar to, the plurality of apertures 224A-224E that extend from the opposing second side surface 226B towards the first side surface 226A. To couple the mounting plate 220 to the jacket portion 218, the trailer ball assembly 210 further includes a plurality of fasteners 228A-228D. As shown in FIG. 9, the fastener 228A and the fastener 228B are each disposed within one of the plurality of apertures 219A-219C of the jacket portion 218 and one of the plurality of apertures 224A-224E of the mounting plate 220, thereby inhibiting movement (e.g., sliding) of the mounting plate 220 relative to the jacket portion 218. The fasteners 228C and 228D are disposed within corresponding apertures on the opposite side of the jacket portion 218 and the mounting plate 220.

Similar to the mounting plate 120 and the trailer ball assembly 110 of the trailer hitch system 100 (FIGS. 1-6), the relative vertical position of the trailer ball 212 relative to the rest of the trailer hitch system 200 can be adjusted by removing the fasteners 228A-228D and sliding the jacket portion 218 relative to the mounting plate 220 to align corresponding apertures. For example, aligning aperture 219C of the jacket portion 218 and aperture 224E of the mounting plate 220 and inserting the fastener 228A will move the vertical position of the trailer ball 212 relative to the rest of the trailer hitch system 200 up relative to the position shown in FIG. 9. Conversely, for example, aligning apertures 219A of the jacket portion 218 and apertures 224A of the mounting plate 220 and inserting the fastener 228B will move the vertical position of the trailer ball 212 relative to the rest of the trailer hitch system 200 down relative to the position shown in FIG. 9. In this manner, the trailer hitch system 200 can be adjusted to adapt to various trailer coupling mechanism configurations, increasing the versatility of the trailer hitch system 200.

Referring generally to FIGS. 11A, 11B, 12A, and 12B, a trailer hitch system 400 that is similar to the trailer hitch system 100 (FIGS. 1-6) and the trailer hitch system 200 (FIGS. 9 and 10) is shown. The trailer hitch system 400 is shown in an exploded configuration in FIGS. 11A-11B, a first assembled configuration in FIG. 12A, and a second assembled configuration in FIG. 12B. The trailer hitch system 400 is similar to the trailer hitch system 100 (FIGS. 1-6) described herein in that the trailer hitch system 400 includes a first swing arm 430 (FIGS. 12A-12B), a second swing arm 440 (FIGS. 12A-12B), a housing 450 (FIGS. 12A-12B), an actuator 460 (FIGS. 12A-12B), and a shaft 470 (FIGS. 12A-12B) that are the same as, or similar to, the first swing arm 130, the second swing arm 140, the housing 150, the actuator 160, and the shaft 170 of the trailer hitch system 100 described herein.

Figure 11A:
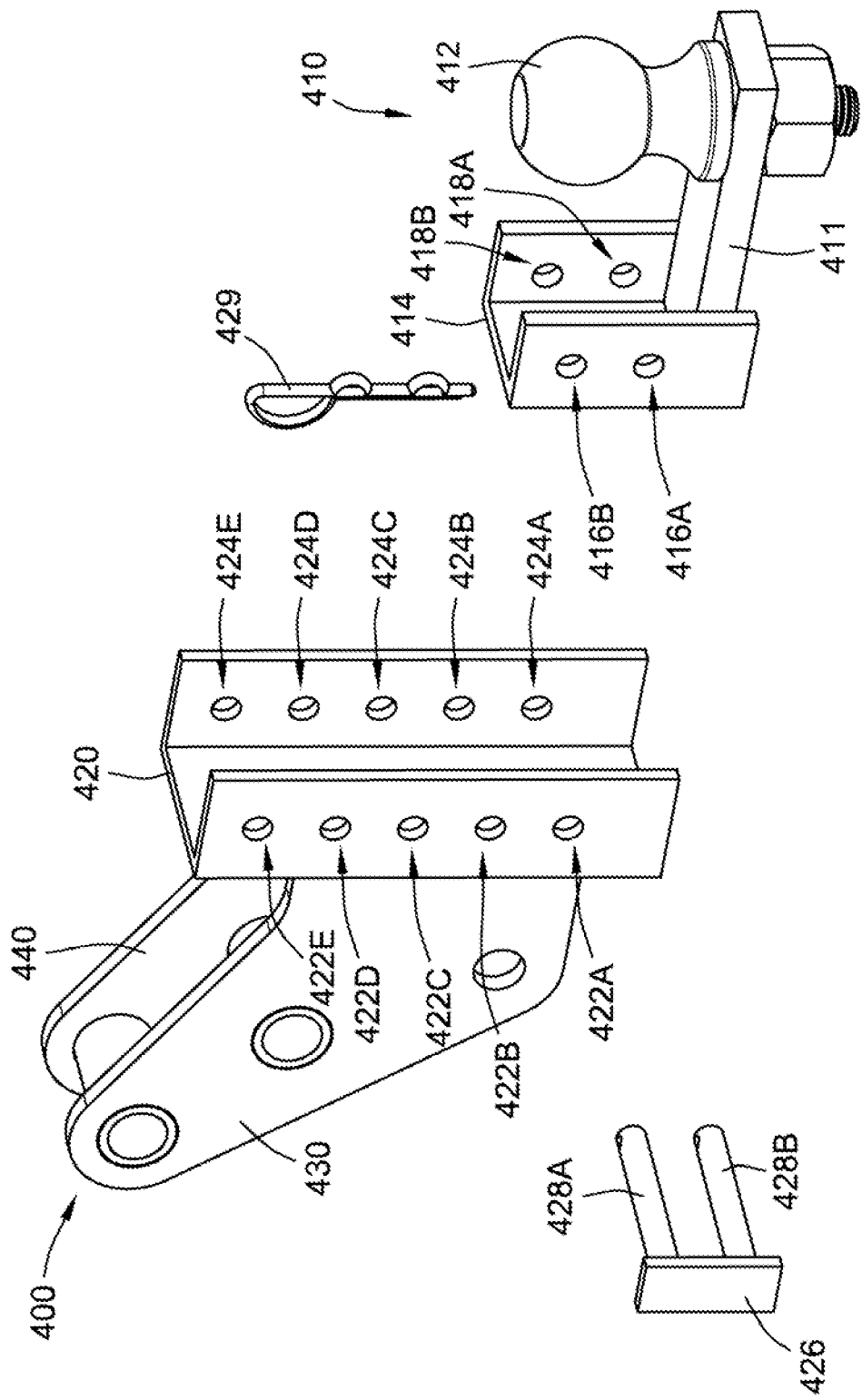

Similar to the trailer hitch system 100 (FIGS. 1-6), the trailer hitch system 400 can include a trailer ball assembly 410. The trailer ball assembly 410 is similar to the trailer ball assembly 110 (FIG. 2) in that the trailer ball assembly 410 includes a trailer ball 412 that is the same as, or similar to, the trailer ball 112. As shown in FIG. 11A, the trailer ball assembly 410 differs in that the trailer ball assembly 410 includes an arm 411 and a mounting adapter 414. The mounting adapter 414 and the arm 411 are coupled together via, for example, a welded connection. Alternatively, the mounting adapter 414 and the arm 411 can be unitary and/or monolithic. The mounting adapter 414 has a general "U" shape and includes a first plurality of apertures 416A-416B on a first side and a second plurality of apertures 418A-418B on a second side. While the mounting adapter 414 is shown as including two apertures on either side, the mounting adapter 414 can more generally include any suitable number of apertures on either side (e.g., one, three, five, etc.)

The trailer hitch system 400 further differs from the trailer hitch system 100 (FIGS. 1-6) in that the trailer hitch system 400 includes a mounting sleeve 420 that is similar to the mounting plate 120 (FIG. 2). As shown in FIG. 11A, the mounting sleeve 420 has a general "U" shape and includes a first plurality of apertures 422A-422E on a first side and a second plurality of apertures 424A-424E on a second side.

Figure 12A:
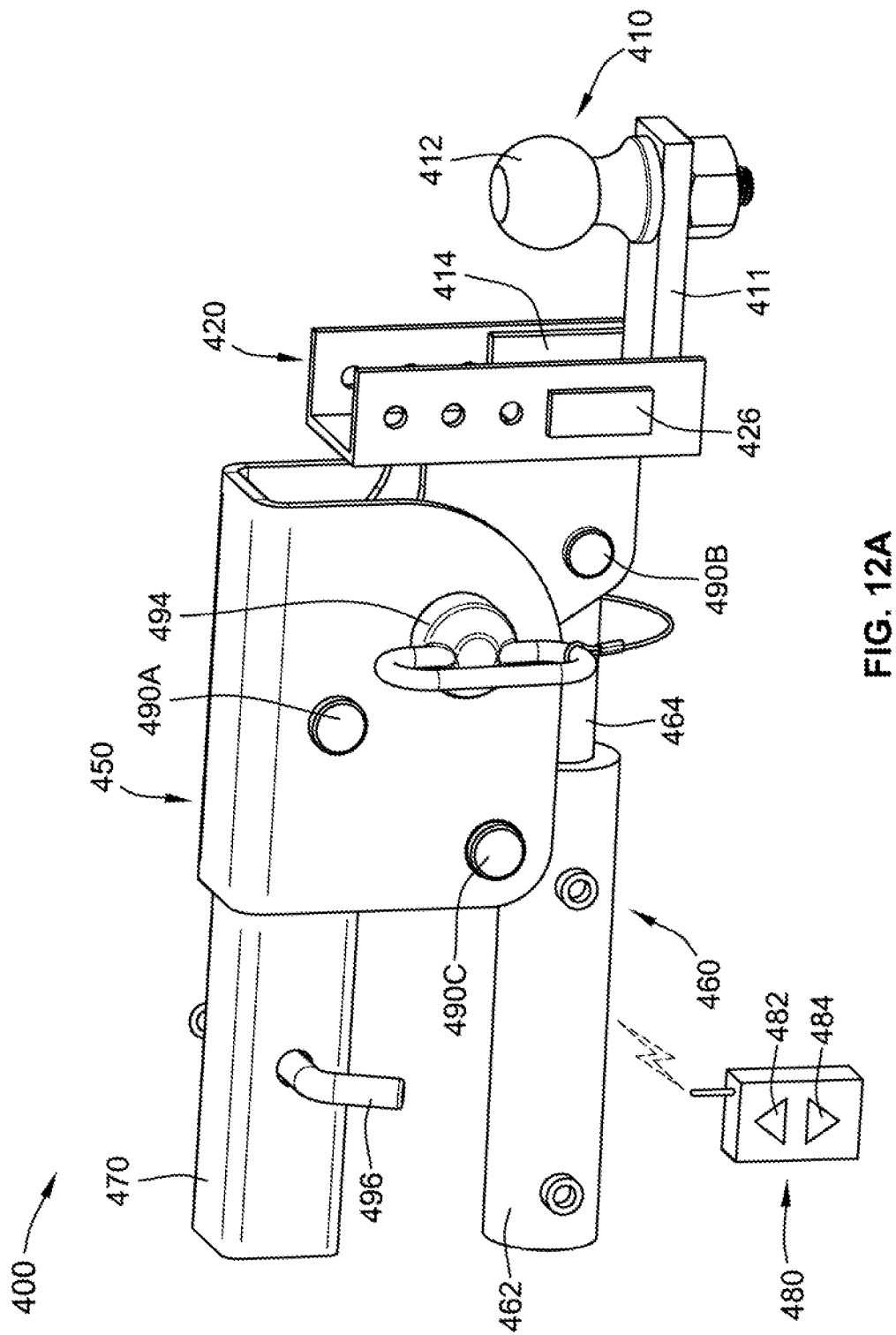
FIG. 12A is perspective view of the trailer hitch system including some implementations from FIG. 11 in a first assembled configuration according to some implementations of the present disclosure.

As shown in the first assembled configuration of FIG. 12A, the mounting sleeve 420 is generally sized and shaped such that the mounting adapter 414 can be received within a portion of the mounting sleeve 420. A first pin 428A and a second pin 428B that are coupled to a plate 426 (FIG. 11A) are used to couple the mounting adapter 414 of the trailer ball assembly 410 to the mounting sleeve 420. Specifically, the first pin 428A can be inserted through a first corresponding pair of the apertures 422A-422E of the mounting sleeve 420 and a first corresponding pair of the apertures 416A-416B and 418A-418B of the mounting adapter 414. Likewise, the second pin 428B can be inserted through a second corresponding pair of the apertures 422A-422E of the mounting sleeve 420 and a second corresponding pair of the apertures 416A-416B. A cotter pin 429 (FIG. 11A) can be inserted through apertures in the first pin 428A and the second pin 428B to aid in securing the mounting plate 420 and the mounting adapter 414 (e.g., such that the mounting adapter 414 does not move relative to the mounting sleeve 420). Thus, similar to the trailer hitch systems 100 and 200 described herein, the position of the trailer ball assembly 410 can be changed relative to the mounting plate 420.

Figure 12B:
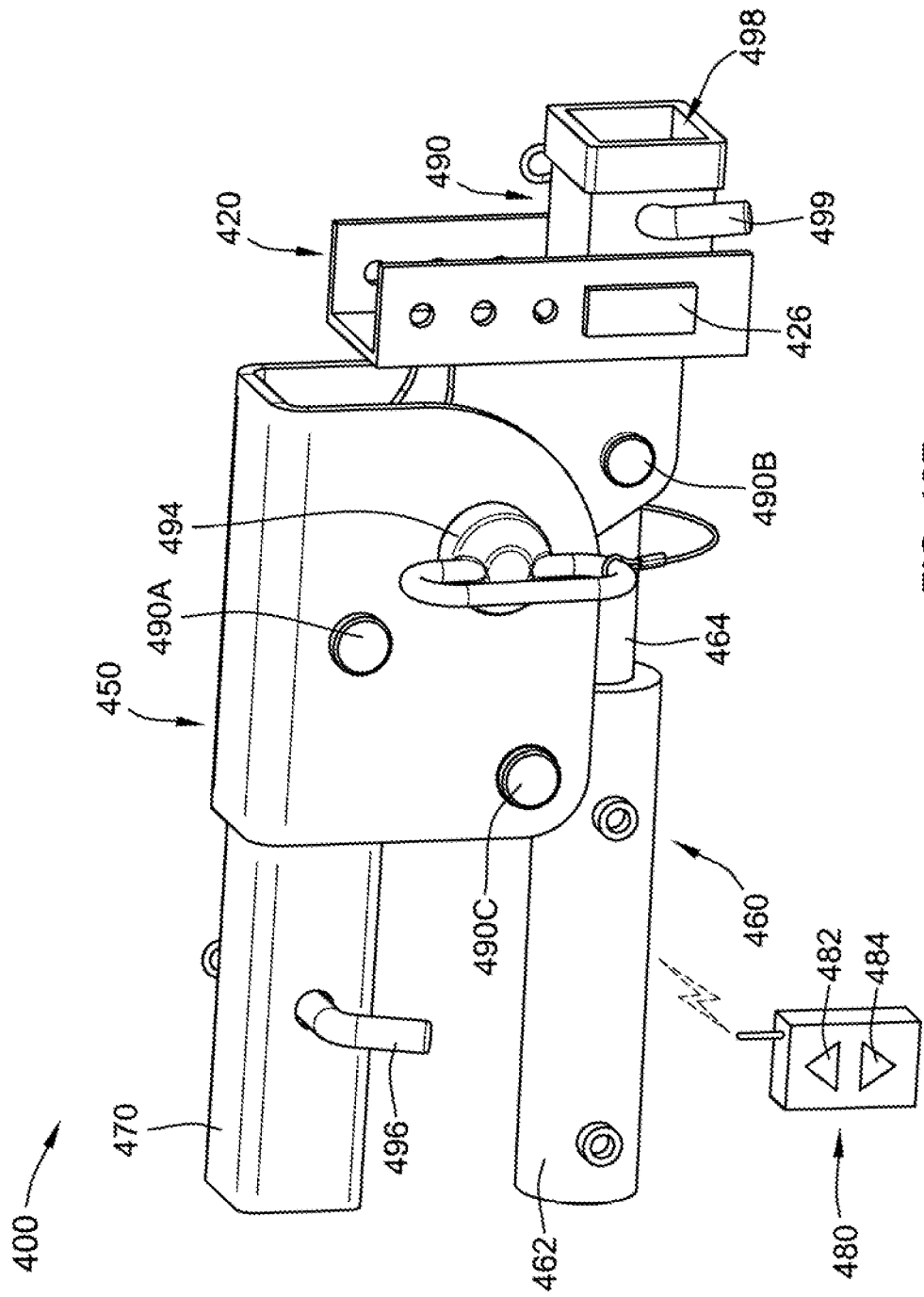
FIG. 12B is perspective view of the trailer hitch system including some implementations from FIG. 11 in a second assembled configuration according to some implementations of the present disclosure.

Referring to FIG. 12B, alternatively, the trail hitch system 400 can be assembled in a second exemplary configuration where the trailer hitch system 400 includes a receiver adapter 490 instead of the trailer ball assembly 410. As shown in FIG. 11B, the receiver adapter 490 includes a main opening 498 for receiving a shaft therein (e.g., in the same or similar manner as the adapter 300 sleeve shown in FIG. 13, described below). The receiver adapter 490 includes a first pair of apertures 492A-492B and a second pair of apertures 494A-494B that are sized and shaped to receive the first pin 428A and the second pin 428B therethrough. Thus, as shown in FIG. 12B, the receiver adapter 490 can be coupled to the mounting sleeve 420 in the same or similar manner as the trailer ball assembly 410 described above. The receiver adapter 490 also includes an aperture 497 that receives an angled mating pin 499 (with a cotter pin arrangement) therein to couple a shaft to the receiver adapter 490. The angled mating pin 499 is the same as, or similar to, mating pin 496.

Referring to FIG. 13, in some implementations, the trailer hitch systems described herein (e.g., the trailer hitch systems 100, 200, 400) can include an adapter sleeve 300. As described above, the trailer hitch system 100 includes a shaft 170 that is received with a received coupled to a vehicle to couple the trailer hitch system 100 to the vehicle. However, not all vehicle receivers are the same size. Trailer hitch receivers are often categorized into different classes (Classes I-V) for different applications (e.g., light towing loads versus heavy towing loads).

For example, Class I and Class II receivers can be coupled to the vehicle bumper or the vehicle frame and have a generally rectangular opening having a length of about 1 inch and a width of about 1.25 inches. In contrast to the Class I and Class II receivers which can be coupled to the vehicle bumper, if desired, Class III, Class IV, and Class V receivers are designed for heavier tow loads and must be coupled to the vehicle frame. Class III and Class IV receivers have a generally rectangular opening having a length of about 2 inches and a width of about 2 inches. Class V receivers also have a generally rectangular opening having a length of about 2.5 inches and a width of about 2.5 inches.

In some implementations, the shaft 170 described herein has a generally square profile with a length and width of about 2 inches thus that the shaft 170 can be received within Class III and Class IV trailer hitch receivers. Alternatively, the shaft 170 can be sized for Class I and Class II receivers. While the shaft 170 may be sized for a Class III or a Class IV receiver, an operator would not be able to use the trailer hitch system with a Class V receiver without modifying the shaft 170. That is, an operator may require a first trailer hitch system for Class III and Class IV receivers and a second trailer hitch system for Class V.

To increase the versatility of the trailer hitch systems described herein, the adapter sleeve 300 can be coupled to the shaft 170. The adapter sleeve 300 has an opening for receiving therein a portion of the shaft 170. As shown, the adapter sleeve 300 has a first dimension $d_1$ that is greater than a second dimension $d_2$ of the shaft 170. For example, the first dimension $d_1$ can be about 2.5 inches and the second dimension $d_2$ can be about 2 inches. That is, the shaft 170 is sized for Class III and Class IV receivers, and the adapter sleeve 300 is sized for Class V receivers. The adapter sleeve 300 includes an aperture 302 that is the same as, or similar to, the aperture 172 (FIG. 2) of the shaft 170 that receivers the mating pin 196 for securing the trailer hitch system to the receiver. Thus, a trailer hitch system can be adapted for Class V receivers by sliding the adapter sleeve 300 onto the shaft 170 and coupling them together (e.g., butt-welding them together) or securing via a pin.

While the adapter sleeve 300 is shown and described as being used to adapt a Class III or Class IV sized shaft 170 for use with a Class V receiver, alternatively, an adapter sleeve that is the same, or similar to, the adapter sleeve 300 can be used to adapt a trailer hitch system for a Class III, IV, or V receiver to a Class I or Class II receiver. In sum, the adapter sleeve is advantageously because it permits the trailer hitch system to be adapted for use with different trailer hitch receiver classes that are required for different towing applications.

In some implementations, the trailer hitch system 100 and/or the trailer hitch system 200 further includes a camera and a display device. The camera is coupled to the vehicle (e.g., the vehicle bumper) or the housing of the trailer hitch system (e.g., housing 150) such that the field of view of the camera is directed at the trailer ball of the trailer hitch system. That is, the camera is positioned such that the engagement/coupling of the trailer ball of the trailer hitch system and the coupling mechanism of the trailer (e.g., as shown in FIG. 8B) are within the field of view of the camera. The camera generates image data reproducible as one or more images of the trailer ball and/or coupling mechanism of the trailer (e.g., still images, video images, or both) that can be displayed via the display device. The display device can be, for example, a touchscreen, a LCD or LED panel, a smartphone, a tablet, a laptop, etc. In one example, the display device is integrated into the dashboard of the vehicle.

In such implementations, the operator can remotely view the position of the trailer ball and trailer coupling mechanism during the steps of the method 700 described herein without having to exit the vehicle and observe the connection. For example, if the controller 180 and the display device are located inside the vehicle, the operator does not need to exit the vehicle to perform steps 701 and 702 of the method. The operator need only exit to retract the trailer jack stand and insert the mating pin in the trail hitch system. In contrast, prior systems often required an operator to exit the vehicle multiple times to confirm proper alignment of the trailer hitch and the trailer coupling mechanism, which is time consuming and labor-intensive.

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

ALTERNATIVE IMPLEMENTATIONS

Implementation 1. A trailer hitch system for coupling a vehicle to a trailer, the system including a housing; a shaft coupled to the housing and configured to be received within a receiver coupled to the vehicle; a mounting plate including a swing arm extending from the mounting plate, the swing arm coupled to the housing such that the swing arm can pivot relative to the housing; and an actuator coupled to (i) the housing such that the actuator can pivot relative to the housing and (ii) the swing arm such that movement of the actuator causes corresponding movement of the swing arm between a first position and a second position.

Implementation 2. The system according to implementation 1, further including a mating pin configured to aid in inhibiting movement of the swing arm relative to the housing responsive to the mating pin being received within an aperture in the housing and a corresponding aperture in the swing arm when the swing arm is in a third position that is between the first position and the second position.

Implementation 3. The system according to any one of implementations 1 to 2, further including a controller communicatively coupled to the actuator, the controller being configured to selectively cause the movement of the swing arm between the first position and the second position.

Implementation 4. The system according to implementation 1 to 3, wherein the controller is configured to receive a first user input indicative of a desire to move the swing arm towards the first position and a second user input indicative of a desire to move the swing arm towards the second position.

Implementation 5. The system according to implementation 4, wherein the controller is communicatively coupled to the actuator via a wireless connection and/or a wired connection.

Implementation 6. The system according to any one of implementations 1 to 5, further including a trailer ball assembly coupled to the mounting plate, the trailer ball assembly including a trailer ball configured to engage a portion of the trailer to aid in coupling the trailer to the vehicle.

Implementation 7. The system according to implementation 6, wherein the trailer ball assembly includes a jacket portion coupled to the trailer ball, the jacket portion being configured to receive a portion of the mounting plate therein.

Implementation 8. The system according to any one of implementations 1 to 7, wherein a portion of the mounting shaft is disposed within and coupled to an adapter sleeve, the adapter sleeve having a first dimension that is greater than a corresponding second dimension of the mounting shaft to aid in coupling the system to the receiver coupled to the vehicle.

Implementation 9. The system according to any one of implementations 1 to 8, further including a camera and a display device, the camera being configured to generate image data reproducible as one or more images including the trailer ball, and the display device being configured to display the one or more images including the trailer ball to aid a user in coupling the trailer to the vehicle.

Implementation 10. A powered trailer hitch system for coupling a trailer to a vehicle, the system including a mounting plate including a pair of swing arms extending therefrom; a trailer ball assembly coupled to the mounting plate, the trailer ball assembly including a trailer ball configured to engage a portion of the trailer; a housing having a base portion, a first side portion, and a second side portion, the first side portion and the second side portion extending from the base portion, the housing being coupled to the pair of swing arms such that the pair of swing arms can pivot relative to the housing; a shaft coupled to the housing, the shaft being configured to couple the trailer hitch system to the vehicle; and an actuator including a cylinder and a piston, the piston being configured to move relative to the cylinder, the cylinder being coupled to the housing, the piston being coupled to the pair of swing arms such that movement of the piston relative to the cylinder causes corresponding movement of the pair of swing arms between a first position and a second position.

Implementation 11. The system according to implementation 10, wherein (i) the pair of swing arms include a first aperture extending therethrough, a second aperture extending therethrough, and a third aperture extending therethrough, (ii) the housing includes a first aperture extending through the first side portion and the second side portion, a second aperture extending through the first side portion and the second side portion, and a third aperture extending through the first side portion and the second side portion, and (iii) the cylinder of the actuator includes a first pivot sleeve and the piston of the actuator includes a second pivot sleeve.

Implementation 12. The system according to implementation 11, further including a mating pin configured to be selectively inserted through the second aperture of the pair of swing arms and the first aperture of the housing when the pair of swing arms are in a third position between the first position and the second position, thereby aiding in inhibiting movement of the pair of swing arms relative to the housing.

Implementation 13. The system according to any one of implementations 10 to 12, wherein the mounting plate has a first surface, a second surface, and a plurality of apertures extending from the first surface to the second surface, and the trailer ball assembly includes (i) a mounting portion having a plurality of apertures and (ii) a plurality of fasteners, the plurality of fasteners being disposed within the plurality of apertures of the mounting portion of the trailer ball assembly and corresponding ones of the plurality of apertures of the mounting plate.

Implementation 14. The system according to any one of implementations 10 to 13, wherein the mounting plate has a first surface, an opposing second surface, a first plurality of apertures extending from the first surface towards the opposing second surface, and a second plurality of apertures extending from the opposing second surface towards the first surface, the trail ball assembly including (i) a jacket portion configured to receive a portion of the mounting plate therein, the jacket portion having a first plurality of apertures and an opposing second plurality of apertures, and (ii) a plurality of fasteners, each of the fasteners being configured to be disposed within one of the first plurality of apertures of the jacket portion and one of the first plurality of apertures of the mounting plate or within one of the second plurality of apertures of the jacket potion and one of the second plurality of apertures of the mounting plate.

Implementation 15. The system according to implementation 14, wherein the trailer ball assembly includes a receiver portion, a rail portion, and a pin, the receiver portion having an aperture and an opening, the rail portion being coupled to the trailer ball and having a plurality of apertures, the rail portion being configured to be disposed within the opening of the receiver portion, the pin being configured to be disposed within the aperture of the receiver portion and one of the plurality of apertures of the rail portion to couple the rail portion to the receiver portion.

Implementation 16. The system according to any one of implementations 10 to 15, further including a controller communicatively coupled to the actuator, the controller being configured to receive a first user input to selectively cause movement of the pair of swing arms towards the second position and a second user input to selectively cause movement of the pair of swing arms towards the first position.

Implementation 17. The system according to any one of implementations 10 to 16, wherein a portion of the shaft is disposed within and coupled to an adapter sleeve, the adapter sleeve having a first dimension that is greater than a corresponding second dimension of the shaft to aid in coupling the powered trailer hitch system to a receiver coupled to the vehicle.

Implementation 18. A method for coupling a trailer to a vehicle using a powered trailer hitch system. the method including positioning a trailer ball of the powered trailer hitch system generally below a coupling mechanism of the trailer, the powered trailer hitch system including a mounting plate, a swing arm, a housing, and an actuator, the swing arm being coupled to the housing at a first pivot point, the actuator being coupled to the housing at a second pivot point and being coupled to the swing arm, the actuator being configured to selectively cause the swing arm to move between a retracted position and an extended position; receiving, using a controller, a first user input indicative of a desire to move the swing arm towards the extended position; and in response to receiving the first user input, actuating, via the controller, the actuator of the trailer hitch to automatically move the swing arm towards the extended position until the trailer ball engages the tongue coupled to the trailer.

Implementation 19. The method according to implementation 18, further including, subsequent to the trailer ball engaging the coupling mechanism of the trailer, retracting a jack stand of the trailer.

Implementation 20. The method according to any one of implementations 18 to 19, further including subsequent to retracting the jack stand, receiving, using the controller, a second user input indicative of a desire to move the swing arm towards the retracted position; in response to receiving the second user input, actuating, via the controller, the actuator of the trailer hitch to automatically move the swing arm towards the retracted position until an aperture in the housing is aligned with a corresponding aperture in the swing arm; and inserting a mating pin through the aperture in the housing and the corresponding aperture in the swing arm to aid in preventing movement of the swing arm relative to the housing.

It is contemplated that any element or any portion thereof from any of implementations 1 to 20 above can be combined with any other element or elements or portion(s) thereof from any of implementations 1 to 20 to form another implementation of the present disclosure.

What is claimed is:

1. A trailer hitch system for coupling a vehicle to a trailer, the system comprising:
a housing;
a shaft coupled to the housing and being configured to be received within a receiver coupled to the vehicle;
a mounting plate including a swing arm extending therefrom, the swing arm being coupled to the housing such that the swing arm can pivot relative to the housing; and
an actuator coupled to (i) the housing such that the actuator can pivot relative to the housing and (ii) the swing arm such that movement of the actuator causes corresponding movement of the swing arm between a first position and a second position,
wherein a portion of the shaft is disposed within and coupled to an adapter sleeve, the adapter sleeve having a first dimension that is greater than a corresponding second dimension of the shaft to aid in coupling the system to the receiver coupled to the vehicle.

2. The system of claim 1, further comprising a mating pin configured to aid in inhibiting movement of the swing arm relative to the housing responsive to the mating pin being received within an aperture in the housing and a corresponding aperture in the swing arm when the swing arm is in a third position that is between the first position and the second position.

3. The system of claim 1, further comprising a controller communicatively coupled to the actuator, the controller being configured to selectively cause the movement of the swing arm between the first position and the second position.

4. The system of claim 3, wherein the controller is configured to receive a first user input indicative of a desire to move the swing arm towards the first position and a second user input indicative of a desire to move the swing arm towards the second position.

5. The system of claim 4, wherein the controller is communicatively coupled to the actuator via a wireless connection.

6. The system of claim 1, further comprising a trailer ball assembly coupled to the mounting plate, the trailer ball assembly including a trailer ball configured to engage a portion of the trailer to aid in coupling the trailer to the vehicle.

7. The system of claim 6, wherein the trailer ball assembly includes a jacket portion coupled to the trailer ball, the jacket portion being configured to receive a portion of the mounting plate therein.

8. The system of claim 1, further comprising a camera and a display device, the camera being configured to generate image data reproducible as one or more images including the trailer ball, and the display device being configured to display the one or more images including the trailer ball to aid a user in coupling the trailer to the vehicle.

9. A powered trailer hitch system for coupling a trailer to a vehicle, the system comprising:
a mounting plate including a pair of swing arms extending therefrom;
a trailer ball assembly coupled to the mounting plate, the trailer ball assembly including a trailer ball configured to engage a portion of the trailer;
a housing having a base portion, a first side portion, and a second side portion, the first side portion and the second side portion extending from the base portion, the housing being coupled to the pair of swing arms such that the pair of swing arms can pivot relative to the housing;
a shaft coupled to the housing, the shaft being configured to couple the trailer hitch system to the vehicle; and
an actuator including a cylinder and a piston, the piston being configured to move relative to the cylinder, the cylinder being coupled to the housing, the piston being coupled to the pair of swing arms such that movement of the piston relative to the cylinder causes corresponding movement of the pair of swing arms between a first position and a second position,
wherein (i) the pair of swing arms include a first aperture extending therethrough, a second aperture extending therethrough, and a third aperture extending therethrough, (ii) the housing includes a first aperture extending through the first side portion and the second side portion, a second aperture extending through the first side portion and the second side portion, and a third aperture extending through the first side portion and the second side portion, and (iii) the cylinder of the actuator includes a first pivot sleeve and the piston of the actuator includes a second pivot sleeve.

10. The system of claim 9, further comprising a mating pin configured to be selectively inserted through the second aperture of the pair of swing arms and the first aperture of the housing when the pair of swing arms are in a third position between the first position and the second position, thereby aiding in inhibiting movement of the pair of swing arms relative to the housing.

11. The system of claim 9, wherein the mounting plate has a first surface, a second surface, and a plurality of apertures extending from the first surface to the second surface, and the trailer ball assembly includes (i) a mounting portion having a plurality of apertures and (ii) a plurality of fasteners, the plurality of fasteners being disposed within the plurality of apertures of the mounting portion of the trailer ball assembly and corresponding ones of the plurality of apertures of the mounting plate.

12. The system of claim 9, wherein the mounting plate has a first surface, an opposing second surface, a first plurality of apertures extending from the first surface towards the opposing second surface, and a second plurality of apertures extending from the opposing second surface towards the first surface, the trail ball assembly including (i) a jacket portion configured to receive a portion of the mounting plate therein, the jacket portion having a first plurality of apertures and an opposing second plurality of apertures, and (ii) a plurality of fasteners, each of the fasteners being configured to be disposed within one of the first plurality of apertures of the jacket portion and one of the first plurality of apertures of the mounting plate or within one of the second plurality of apertures of the jacket portion and one of the second plurality of apertures of the mounting plate.

13. The system of claim 12, wherein the trailer ball assembly includes a receiver portion, a rail portion, and a pin, the receiver portion having an aperture and an opening, the rail portion being coupled to the trailer ball and having a plurality of apertures, the rail portion being configured to be disposed within the opening of the receiver portion, the pin being configured to be disposed within the aperture of the receiver portion and one of the plurality of apertures of the rail portion to couple the rail portion to the receiver portion.

14. The system of claim 9, further comprising a controller communicatively coupled to the actuator, the controller being configured to receive a first user input to selectively cause movement of the pair of swing arms towards the second position and a second user input to selectively cause movement of the pair of swing arms towards the first position.

15. The system of claim 9, wherein a portion of the shaft is disposed within and coupled to an adapter sleeve, the adapter sleeve having a first dimension that is greater than a corresponding second dimension of the shaft to aid in coupling the powered trailer hitch system to a receiver coupled to the vehicle.

16. A method for coupling a trailer to a vehicle using a powered trailer hitch system, the method comprising:
positioning a trailer ball of the powered trailer hitch system generally below a coupling mechanism of the trailer, the powered trailer hitch system including a mounting plate, a swing arm, a housing, and an actuator, the swing arm being coupled to the housing at a first pivot point, the actuator being coupled to the housing at a second pivot point and the actuator being coupled to the swing arm, the actuator being configured to selectively cause the swing arm to move between a retracted position and an extended position;
receiving, using a controller, a first user input indicative of a desire to move the swing arm towards the extended position; and
in response to receiving the first user input, actuating, via the controller, the actuator of the trailer hitch to automatically move the swing arm towards the extended position until the trailer ball engages the coupling mechanism of the trailer; and
subsequent to the trailer ball engaging the coupling mechanism of the trailer, retracting a jack stand of the trailer.

17. The method of claim 16, further comprising:
subsequent to retracting the jack stand, receiving, using the controller, a second user input indicative of a desire to move the swing arm towards the retracted position;
in response to receiving the second user input, actuating, via the controller, the actuator of the trailer hitch to automatically move the swing arm towards the retracted position until an aperture in the housing is aligned with a corresponding aperture in the swing arm; and
inserting a mating pin through the aperture in the housing and the corresponding aperture in the swing arm to aid in preventing movement of the swing arm relative to the housing.

18. A trailer hitch system for coupling a vehicle to a trailer, the system comprising:
a housing;
a shaft coupled to the housing and being configured to be received within a receiver coupled to the vehicle;
a mounting plate including a swing arm extending therefrom, the swing arm being coupled to the housing such that the swing arm can pivot relative to the housing;
an actuator coupled to (i) the housing such that the actuator can pivot relative to the housing and (ii) the swing arm such that movement of the actuator causes corresponding movement of the swing arm between a first position and a second position, and
a controller communicatively coupled to the actuator, the controller being configured to selectively cause the movement of the swing arm between the first position and the second position,
wherein the controller is configured to receive a first user input indicative of a desire to move the swing arm towards the first position and a second user input indicative of a desire to move the swing arm towards the second position, and
wherein the controller is communicatively coupled to the actuator via a wireless connection.

19. A powered trailer hitch system for coupling a trailer to a vehicle, the system comprising:
a mounting plate including a pair of swing arms extending therefrom;
a trailer ball assembly coupled to the mounting plate, the trailer ball assembly including a trailer ball configured to engage a portion of the trailer;
a housing having a base portion, a first side portion, and a second side portion, the first side portion and the second side portion extending from the base portion, the housing being coupled to the pair of swing arms such that the pair of swing arms can pivot relative to the housing;
a shaft coupled to the housing, the shaft being configured to couple the trailer hitch system to the vehicle; and
an actuator including a cylinder and a piston, the piston being configured to move relative to the cylinder, the cylinder being coupled to the housing, the piston being coupled to the pair of swing arms such that movement of the piston relative to the cylinder causes corresponding movement of the pair of swing arms between a first position and a second position,
wherein the mounting plate has a first surface, a second surface, and a plurality of apertures extending from the first surface to the second surface, and the trailer ball assembly includes (i) a mounting portion having a plurality of apertures and (ii) a plurality of fasteners, the plurality of fasteners being disposed within the plurality of apertures of the mounting portion of the trailer ball assembly and corresponding ones of the plurality of apertures of the mounting plate.

20. A powered trailer hitch system for coupling a trailer to a vehicle, the system comprising:
a mounting plate including a pair of swing arms extending therefrom;
a trailer ball assembly coupled to the mounting plate, the trailer ball assembly including a trailer ball configured to engage a portion of the trailer;
a housing having a base portion, a first side portion, and a second side portion, the first side portion and the second side portion extending from the base portion, the housing being coupled to the pair of swing arms such that the pair of swing arms can pivot relative to the housing;
a shaft coupled to the housing, the shaft being configured to couple the trailer hitch system to the vehicle; and
an actuator including a cylinder and a piston, the piston being configured to move relative to the cylinder, the cylinder being coupled to the housing, the piston being coupled to the pair of swing arms such that movement of the piston relative to the cylinder causes corresponding movement of the pair of swing arms between a first position and a second position,
wherein the mounting plate has a first surface, an opposing second surface, a first plurality of apertures extending from the first surface towards the opposing second surface, and a second plurality of apertures extending from the opposing second surface towards the first surface, the trail ball assembly including (i) a jacket portion configured to receive a portion of the mounting plate therein, the jacket portion having a first plurality of apertures and an opposing second plurality of apertures, and (ii) a plurality of fasteners, each of the fasteners being configured to be disposed within one of the first plurality of apertures of the jacket portion and one of the first plurality of apertures of the mounting plate or within one of the second plurality of apertures of the jacket portion and one of the second plurality of apertures of the mounting plate.

21. The system of claim 20, wherein the trailer ball assembly includes a receiver portion, a rail portion, and a pin, the receiver portion having an aperture and an opening, the rail portion being coupled to the trailer ball and having a plurality of apertures, the rail portion being configured to be disposed within the opening of the receiver portion, the pin being configured to be disposed within the aperture of the receiver portion and one of the plurality of apertures of the rail portion to couple the rail portion to the receiver portion.

22. A powered trailer hitch system for coupling a trailer to a vehicle, the system comprising:
a mounting plate including a pair of swing arms extending therefrom;
a trailer ball assembly coupled to the mounting plate, the trailer ball assembly including a trailer ball configured to engage a portion of the trailer;
a housing having a base portion, a first side portion, and a second side portion, the first side portion and the second side portion extending from the base portion, the housing being coupled to the pair of swing arms such that the pair of swing arms can pivot relative to the housing;
a shaft coupled to the housing, the shaft being configured to couple the trailer hitch system to the vehicle; and
an actuator including a cylinder and a piston, the piston being configured to move relative to the cylinder, the cylinder being coupled to the housing, the piston being coupled to the pair of swing arms such that movement of the piston relative to the cylinder causes corresponding movement of the pair of swing arms between a first position and a second position, wherein a portion of the shaft is disposed within and coupled to an adapter sleeve, the adapter sleeve having a first dimension that is greater than a corresponding second dimension of the shaft to aid in coupling the powered trailer hitch system to a receiver coupled to the vehicle.

* * * * *